United States Patent
Hinderthuer et al.

(10) Patent No.: US 8,358,934 B2
(45) Date of Patent: Jan. 22, 2013

(54) DATA TRANSPORT SYSTEM WITH AN EMBEDDED COMMUNICATION CHANNEL

(75) Inventors: Henning Hinderthuer, Finning (DE); Marcus Sauter, Meiningen (DE); Lars Friedrich, München (DE)

(73) Assignee: Adva AG Optical Networking, Martinsried, Munich (DE)

(*) Notice: Subject to any disclaimer, the term of this patent is extended or adjusted under 35 U.S.C. 154(b) by 706 days.

(21) Appl. No.: 12/332,919

(22) Filed: Dec. 11, 2008

(65) Prior Publication Data
US 2009/0154918 A1     Jun. 18, 2009

(30) Foreign Application Priority Data

Dec. 12, 2007 (EP) .................................... 07123047
May 20, 2008 (EP) .................................... 08156577

(51) Int. Cl.
*H04B 10/00* (2006.01)
(52) U.S. Cl. ........ 398/162; 398/141; 398/138; 398/113; 398/25
(58) Field of Classification Search .............. 398/25–34, 398/162, 141
See application file for complete search history.

(56) References Cited

U.S. PATENT DOCUMENTS

| | | | |
|---|---|---|---|
| 7,107,414 B2* | 9/2006 | Hidai et al. | 711/154 |
| 7,394,981 B2* | 7/2008 | Manifold | 398/17 |
| 7,518,883 B1* | 4/2009 | Suitor et al. | 361/788 |
| 7,596,314 B2* | 9/2009 | Manifold | 398/31 |
| 7,757,936 B2* | 7/2010 | Aguren et al. | 235/375 |
| 2003/0215236 A1* | 11/2003 | Manifold | 398/79 |
| 2003/0218981 A1* | 11/2003 | Scholten | 370/235 |
| 2004/0114931 A1* | 6/2004 | Talbot | 398/83 |
| 2004/0252688 A1* | 12/2004 | May et al. | 370/389 |
| 2005/0044335 A1* | 2/2005 | Bee et al. | 711/170 |
| 2005/0086336 A1* | 4/2005 | Haber | 709/223 |
| 2005/0265329 A1* | 12/2005 | Havala et al. | 370/389 |
| 2006/0159112 A1* | 7/2006 | Sundaram et al. | 370/412 |
| 2006/0209886 A1* | 9/2006 | Silberman et al. | 370/466 |
| 2007/0086479 A1* | 4/2007 | Ling et al. | 370/463 |
| 2007/0092257 A1* | 4/2007 | Smith et al. | 398/135 |
| 2008/0022363 A1* | 1/2008 | Le et al. | 726/2 |
| 2008/0089693 A1* | 4/2008 | El-Ahmadi et al. | 398/135 |
| 2009/0103926 A1* | 4/2009 | Hotchkiss et al. | 398/135 |
| 2009/0154918 A1* | 6/2009 | Hinderthuer et al. | 398/9 |

(Continued)

FOREIGN PATENT DOCUMENTS
WO        03/084281        10/2003

OTHER PUBLICATIONS

Okamoto S. Et al., "IP Backbone Network Utilizing Photonic Transport Network Technologies", Optical Networks Magazine, SPIE, Bellingham, WA, US, vol. 1, No. 1, (Jan. 1, 2001), pp. 19-28.

(Continued)

*Primary Examiner* — Augustin Bello
(74) *Attorney, Agent, or Firm* — F. Chau & Associates, LLC

(57) ABSTRACT

A network comprising at least one host device having an interface card connected to a backplane of said host device, wherein said interface card comprises at least one cage for receiving a pluggable module which provides at least one embedded communication channel which exchanges performance monitoring data and configuration data between said pluggable module and a far end device.

26 Claims, 31 Drawing Sheets

U.S. PATENT DOCUMENTS

| | | | | |
|---|---|---|---|---|
| 2009/0154930 A1* | 6/2009 | Hinderthuer | | 398/83 |
| 2009/0154932 A1* | 6/2009 | Hinderthuer | | 398/98 |
| 2009/0161689 A1* | 6/2009 | Hinderthuer et al. | | 370/463 |
| 2009/0162057 A1* | 6/2009 | Friedrich et al. | | 398/43 |
| 2009/0240945 A1* | 9/2009 | Aronson | | 713/176 |
| 2009/0317073 A1* | 12/2009 | Hotchkiss et al. | | 398/1 |
| 2011/0135312 A1* | 6/2011 | El-Ahmadi et al. | | 398/135 |

OTHER PUBLICATIONS

Office Action dated Mar. 27, 2009 in corresponding European Patent Application 08156577.2.

Office Action dated Mar. 30, 2009 in corresponding European Patent Application 08171513.8.

Office Action dated Mar. 30, 2009 in corresponding European Patent Application 07150171.2.

Office Action dated Mar. 30, 2009 in corresponding European Patent Application 08171352.1.

Office Action dated Apr. 4, 2009 in corresponding European Patent Application 08171052.7.

Office Action dated Apr. 6, 2009 in corresponding European Patent Application 08171206.9.

Office Action dated Apr. 6, 2009 in corresponding European Patent Application 08171376.0.

* cited by examiner

State of the art

State of the art

State of the art

State of the art

Fig. 8
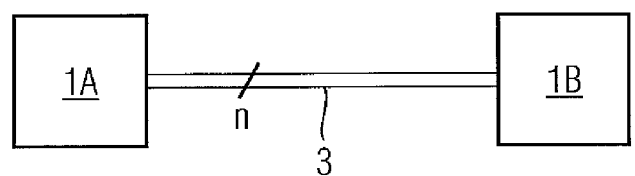
Fig. 9A
Fig. 9B
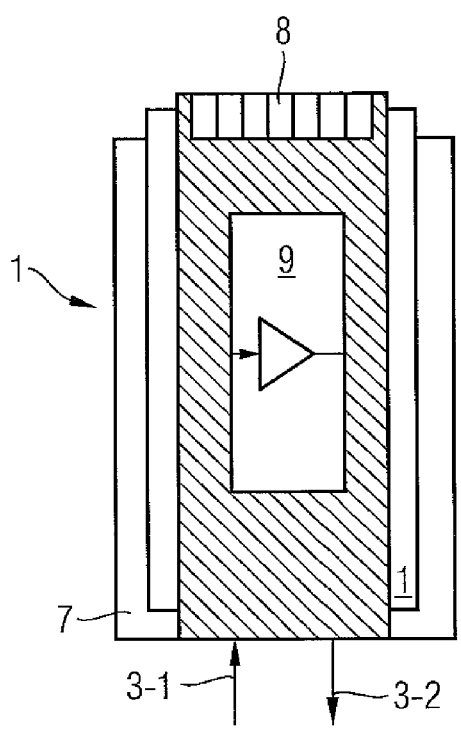
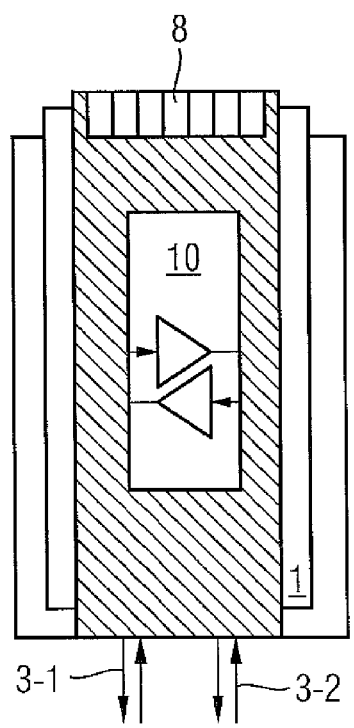

Fig. 15

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

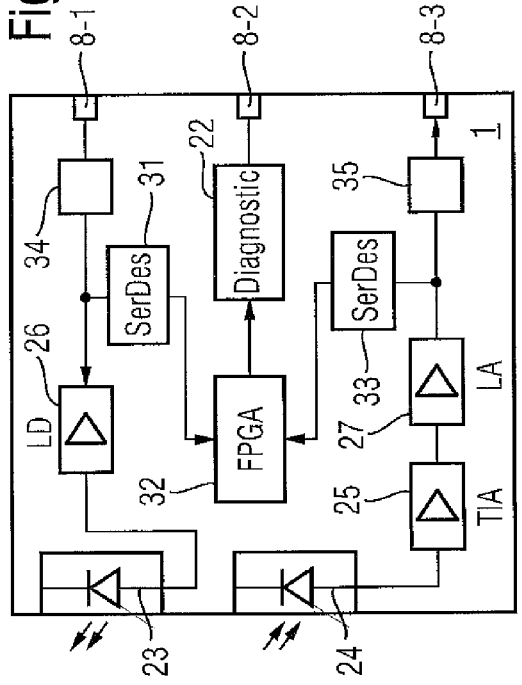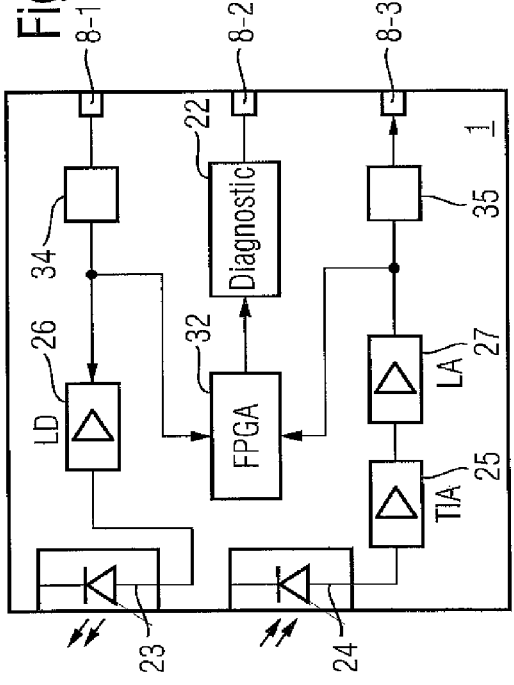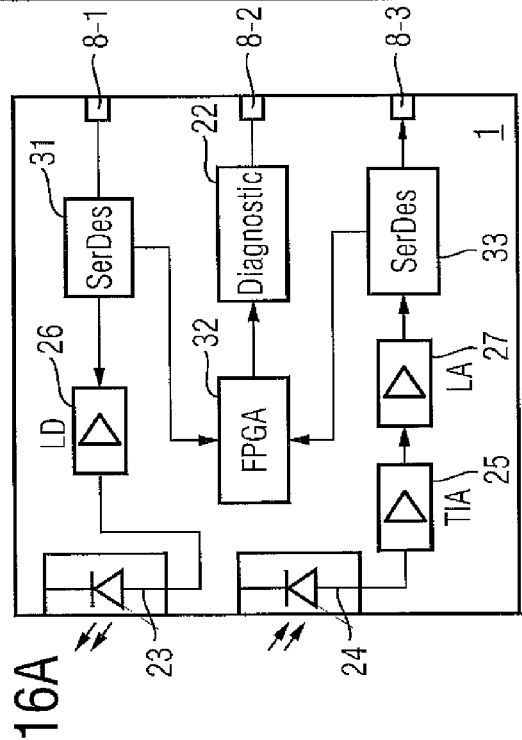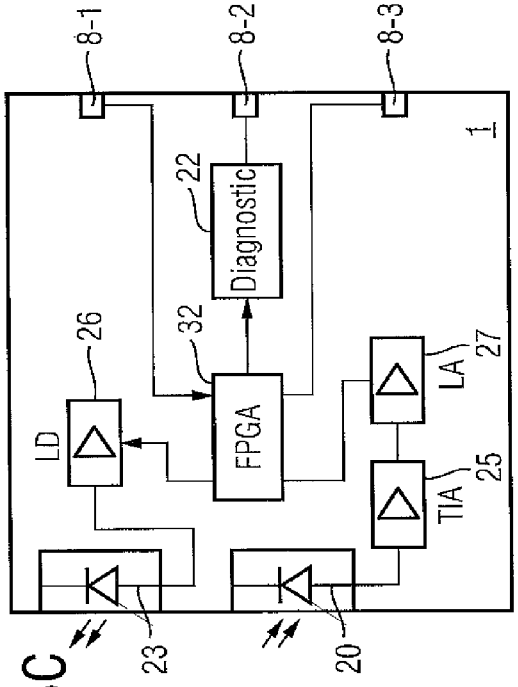

Fig. 17A

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin.  |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

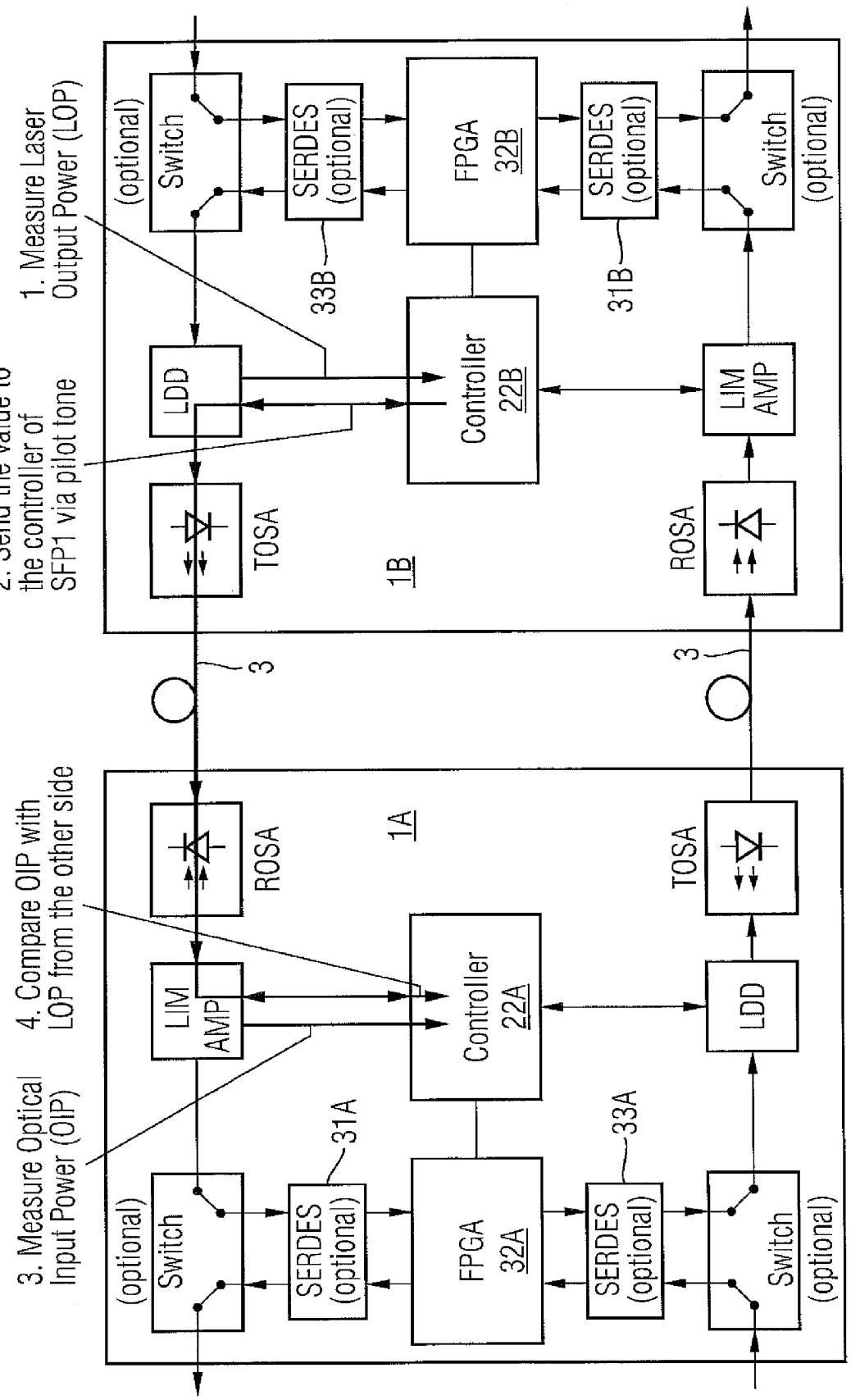

DATA TRANSPORT SYSTEM WITH AN EMBEDDED COMMUNICATION CHANNEL

BACKGROUND OF THE INVENTION

The invention relates to a data transport system with an embedded communication channel which exchanges performance monitoring data and configuration data between a pluggable module and a far end device.

FIG. 1 shows an architecture of an optical network according to the state of the art. The network architecture is hierarchical having the highest data rates in an optical core network, such as a back-bone network of a country. To each core network several optical metro networks can be connected, for instance in a ring structure. To each metro network in turn several access networks can be connected. The edge of the network as shown in FIG. 1 is formed by terminal devices T which can be connected via xDSL (version of Digital Subscriber Line) to a host device, for example to a switch in an DSLAM (Digital Subscriber Line Access Multiplexer). This switch is connected via an optical transport system (designated as FSP in all figures) and optical transport means to a transport system of a local exchange. The core, metro and access network can have a ring structure, for example formed by two optical fibres and by transport systems. The optical fibres can transport data by means of wave length division multiplexing WDM. In wave length division multiplexing WDM optical carrier signals are multiplexed on a single optical fibre by using different wave lengths λ (colours) to carry different data signals. This allows an increased bandwidth and makes it possible to perform bidirectional communication over one strand of fibre. WDM-systems allow to expand the capacity of a network without laying more fibre. The capacity of an optical fibre can be expanded by upgrading multiplexers and demultiplexers at each end. This is often done by using optical-to-electrical-to-optical conversion at the edge of the transport network to permit interoperation with existing equipment. WDM-systems can be divided in different wave length patterns, i.e. conventional or coarse and dense WDM (CWDM, DWDM). A recent development relating course WDM is the creation of GBIC (Gigabit Interface Converter) and Small Form Factor Pluggable (SFP) transceivers using standardized CWDM-wave lengths.

As can be seen from FIG. 1, an optical network can be formed by two main components, i.e. by a transport system and by host devices. Host devices include switching devices, such as routers, bridges, Ethernet switches, fibre channel switches or cross-connects. The network architecture as shown in FIG. 1 comprises optical interconnections, optical transport systems and host devices, such as switches or routers. The separation of functionality in two different device types of the conventional network as shown in FIG. 1, i.e. on the one hand transport of data (by the transport system) and on the other hand aggregation/switching data (by the host devices) increases complexity and costs.

Accordingly, it has been proposed to shift functionality of the transport system, in particular the electrical-to-optical conversion, into the host device by using pluggable transceivers.

A small form factor pluggable (SFP) is a compact optical transceiver using optical communication. A conventional small form factor pluggable module interfaces a network device mother board of a host device, such as a switch or router to an optical fibre or unshielded twisted pair networking cable. The SFP-transceivers are available in a variety of different transmitter and receiver types allowing users to select an appropriate transceiver for each link to provide a required optical reach over the available optical fibre type.

A SFP-transceiver is specified by a multi-source agreement (MSA) between competing manufacturers. The SFP-module is designed after the GBIC-interface and allows greater data port density (i.e. number of transceivers per inch along the edge of a mother board) than GBIC. SFP-transceivers are commercially available and have a capability for data rates up to 4.25 Gbit/sec. A variant standard, XFP, is capable of 10 Gbit/sec.

Some SFP-transceivers support digital optical monitoring functions according to the industry standards SSF 8472 (ftp://ftp.seagate.com/sff/SFF-8472.PDF) multi-source agreement (MSA). This makes it possible for an end user to monitor real time parameters of the SFP-module, such as optical output power, optical input power, temperature, laser bias current and transceiver supply voltage.

FIGS. 2, 3 show a pluggable standard SFP-transceiver module according to the state of the art. The SFP pluggable module comprises an electrical interface connecting the pluggable module with a mother board of a host device by plugging the module into a cage of the host device board. On the front side of the pluggable module at least one optical fibre is attached to the module.

FIG. 4 shows a conventional system with pluggable SFP-transceivers according to the state of the art. A host device, such as a switch or router, comprises a controller which is connected via a backplane to interface cards each having several cages which allow to plug in SFP-modules as shown in FIG. 3. A transceiver within the pluggable module performs a conversion of the applied electrical signals to an optical signal which is forwarded via an optical fibre to the transport system. The transport system comprises several cards which comprise several cages for plug-in SFP-transceiver modules. These interface cards allow a switching, i.e. multiplexing or demultiplexing of signals within the electrical domain in response to control signals generated by a controller of the transport system and received via an internal management connection. From the interface cards within the transport system the switched or controlled signals are applied to further modules for optical signals or optical fibres. These modules can, for example comprise variable optical attenuators (VOA), multiplexers/demultiplexers, amplifiers, switchers etc. From the transport system connected to the near end host device, the signals are forwarded via optical fibres to remote far end transport systems over a distance of many kilometers, wherein the remote transport systems are in turn connected to far end host devices.

The conventional system as shown in FIG. 4 has the disadvantage that the complexity of the system is quite high because three domain conversions on the near end side and on the far end side have to be performed. As can be seen from FIG. 4, an electrical signal of the near end host device is converted within the pluggable SFP-transceivers plugged into the interface card of the host device to an optical signal and then retransformed from the optical domain to the electrical domain by a SFP-transceiver plugged into a cage of an interface card of the transport system. After an electrical switching is performed depending on the control signal supplied by the controller of the transport system, the electrical signal is again transformed from the electrical domain into an optical domain by another plugged in SFP-transceiver. Accordingly at the near end side, three domain conversions, i.e. an electrical-to-optical, an optical-to-electrical and an electrical-to-optical conversion are necessary. On the far end side, the three conversions are performed again resulting in a total of six domain conversions. Because of the necessary domain conversions, the technical complexity of the system is quite high. Since two different devices, i.e. a host device and a transport system have to be provided on each side management efforts, the occupied space and power consumption are increased.

Accordingly, it is an object of the present invention to provide a method and a system which minimizes the number of necessary domain conversions and which reduce the complexity of a network system.

SUMMARY OF THE INVENTION

The invention provides a network comprising at least one host device having an interface card connected to a back plane of said host device, wherein said interface card comprises at least one cage for receiving a pluggable module which provides at least one embedded communication channel (ECC) which exchanges performance monitoring data and configuration data between the pluggable module and a far end device.

In an embodiment the far end device is formed by a pluggable module or by a host device.

In an embodiment of the network according to the present invention the pluggable module performs a traffic management transported via at least one optical fibre connectable to the pluggable module.

In an embodiment of the network according to the present invention the configuration data comprises physical device configuration data and transport protocol configuration data.

In an embodiment of the network according to the present invention the performance monitoring data comprises physical performance monitoring data and transport protocol performance monitoring data.

In an embodiment of the network according to the present invention the physical performance monitoring data comprises transmit power data, reception power data, supply voltage data, temperature data and bias voltage data.

In an embodiment of the network according to the present invention the transport protocol performance monitoring data comprises bit error rate indication data, corrected or uncorrected forward error correction indication data, code violation indication data and frame drop indication data.

In an embodiment of the network according to the present invention said near end pluggable module is provided via the embedded communication channel with near end transport protocol parameters detected at the near end pluggable module, with far end transport protocol parameters detected at the far end device and with far end physical performance monitoring parameters of the far end device.

In an embodiment of the network according to the present invention the near end pluggable module is provided via the embedded communication channel with configuration data for near end protocol parameters, with configuration data for far end protocol parameters and with configuration data for far end physical device parameters.

In an embodiment of the network according to the present invention the parameters are exchanged via unallocated memory cells of a memory within a diagnostic unit of the near end pluggable module at a reduced transfer rate which is smaller than the refreshing rate of the memory cells.

In an embodiment of the network according to the present invention the far end physical performance monitoring parameters are exchanged via memory cells of a memory within a diagnostic unit of the near end pluggable module at a reduced transfer rate which is half the refresh rate of the memory cells.

In an embodiment of the network according to the present invention the configuration data for far end physical device parameters are exchanged via memory cells of a memory within a diagnostic unit of the near end pluggable module.

In an embodiment of the network according to the present invention the network is a SFF-8472 memory.

In an embodiment of the network according to the present invention the network comprises a first page for storing static data and a second page having a storage area provided for storing dynamic data.

In an embodiment of the network according to the present invention the performance monitoring data and the configuration data are exchanged via the storage area of the second page provided for storing dynamic data.

In an embodiment of the network according to the present invention a third page is provided within the memory for exchanging performance monitoring data and configuration data via the embedded communication channel ECC.

In an embodiment of the network according to the present invention the performance monitoring data and the configuration data are transported according to a digital diagnostic interface DDI mapping protocol.

In an embodiment of the network according to the present invention the near end pluggable module generates link parameters of a link between the near end pluggable module and a far end device depending on near end parameters of the near end pluggable module and depending on far end parameters of the far end device.

In an embodiment of the network according to the present invention the generated link parameters comprise physical link parameters and transport protocol link parameters.

In an embodiment of the network according to the present invention the physical device configuration data exchanged between the pluggable module and the far end device via the embedded communication channel comprises signal path control data for signal path switching in the near end pluggable module and/or the far end device.

In an embodiment of the network according to the present invention the signal path control data controls signal path switches provided in a signal path of the near end pluggable module or the far end device.

In an embodiment of the network according to the present invention the signal path switches are implemented in a FPGA of the pluggable module.

In an embodiment of the network according to the present invention the signal path control data controls the signal path switches of the far end device such that a signal loop is formed.

In an embodiment of the network according to the present invention a pointer within a header of a transport protocol frame transmitted by the near end pluggable module is looped back by the far end device via the signal loop to the near end pluggable module for a latency measurement.

In an embodiment of the network according to the present invention a transport protocol frame comprising a header and a payload is transmitted by the near end pluggable module and looped back by the far end device via the signal loop to the near end pluggable module for a link test.

In an embodiment of the network according to the present invention the generated physical link parameter comprise a link attenuation of a link between the near end pluggable module and the far end device.

In an embodiment of the network according to the present invention the link attenuation is calculated as a difference between the transmit power of the near end pluggable module and the reception power of the far end device.

In an embodiment of the network according to the present invention the generated transport protocol link parameters comprise a link quality.

In an embodiment of the network according to the present invention the link quality is calculated on the basis of a bit error rate BER detected at the near end pluggable module and a bit error rate BER detected at the far end device.

In an embodiment of the network according to the present invention the performance monitoring data and the configuration data of a far end host device are exchanged via a third page provided within the memory.

In an embodiment of the network according to the present invention the near end pluggable module and the far device are connected by at least one optical fibre.

In an embodiment of the network according to the present invention a first embedded communication channel is provided for transporting data from said near end pluggable module to said far end device and a second embedded communication channel is provided for transporting data from the far end device to the near end pluggable module.

In an embodiment of the network according to the present invention a first embedded communication channel transports data via a first optical fibre and a second embedded communication channel transports data via a second optical fibre.

In an embodiment of the network according to the present invention the first embedded communication channel and the second embedded communication channel transport data via the same optical fibre, wherein the first embedded communication channel uses a first wave length and wherein the second embedded communication channel uses a second wave length.

In an embodiment of the network according to the present invention the host devices comprise switching devices and optical transport devices.

In an embodiment of the network according to the present invention the switching devices comprise router, bridges, Ethernet switches and fibre channel switches.

In an embodiment of the network according to the present invention the optical transport devices comprise SDH-, SONETH-, PDH-, OTH-, Ethernet, Fibre Channel, FICON and uncompressed video transport devices.

In an embodiment of the network according to the present invention the embedded communication channel is implemented at a physical layer.

In an embodiment of the network according to the present invention the embedded communication channel is provided by sideband modulation of a data signal of said transported data.

In an embodiment of the network according to the present invention the embedded communication channel is implemented at a protocol layer.

In an embodiment of the network according to the present invention the embedded communication channel (FCC) uses a bandwidth provided for a transport protocol for exchanging data between the pluggable module and the far end device.

In an embodiment of the network according to the present invention the embedded communication channel (FCC) is provided by amplitude shift keying (ASK), frequency shift keying (FSK) or phase shift keying (PSK).

In an embodiment of the network according to the present invention the embedded communication channel is implemented on a proprietary overhead that is generated on top of a transport protocol.

In an embodiment of the network according to the present invention, the embedded communication channel is implemented based on an overhead of a transport protocol.

In an embodiment of the network according to the present invention the embedded communication channel is implemented in the frame structure of a protocol.

In an embodiment of the network according to the present invention the pluggable module comprises a diagnostic unit which receives local performance data from electronic components of the pluggable module.

In an embodiment of the network according to the present invention the diagnostic unit comprises a memory for storing performance data and configuration data of the pluggable module.

In an embodiment of the network according to the present invention the pluggable module comprises a mapping unit which controls a laser driver depending on local performance data received from said diagnostic unit to transfer the performance data via the embedded communication channel to said far end device.

In an embodiment of the network according to the present invention the pluggable module comprises a de-mapping unit for storing performance data extracted from the embedded communication channel ECC in a memory of said diagnostic unit.

In an embodiment of the network according to the present invention the performance monitoring data comprises SFF-8472 performance parameters.

In an embodiment of the network according to the present invention the memory is a SFF-8472 memory comprising unallocated bytes used for exchanging DMI (digital monitoring interface) performance data with a far end device.

In an embodiment of the network according to the present invention a second set of the SFF-8472 performance data indicating a performance at the far end is stored in the memory.

In an embodiment of the network according to the present invention near end or far end digital performance parameters are stored in said memory.

In an embodiment of the network according to the present invention the pluggable module performs near end and far end bidirectional performance monitoring.

In an embodiment of the network according to the present invention the pluggable module comprises at least one data processing circuit for performing performance monitoring.

In an embodiment of the network according to the present invention the data processing circuit comprises a FPGA, ASIC, EPLD or CPLD.

In an embodiment of the network according to the present invention the data processing circuit is connected to a diagnostic unit of the pluggable module.

In an embodiment of the network according to the present invention the data processing circuit increments at least one performance counter provided in a memory of the diagnostic unit depending on measured performance monitoring data.

In an embodiment of the network according to the present invention the memory of the diagnostic unit is a SFF-8472 memory comprising unallocated bytes used for a ES (error seconds), a SES (severe error seconds) performance counter, a UAS (Unavailable Seconds) performance counter and a BER (bit error rate) performance counter.

In an embodiment of the network according to the present invention the pluggable module comprises a SERDES (serial deserializer) for supplying data from a transmit data path to said data processing circuit and a SERDES for supplying data from a reception data path of said pluggable module to said data processing circuit.

In an embodiment of the network according to the present invention the pluggable module performs a latency measurement of a latency for transporting data from said pluggable module to a far end pluggable module or to a far end device.

In an embodiment of the network according to the present invention the pluggable module performs a link test.

The invention further provides an interface card for a host device comprising at least one cage for receiving a pluggable module which performs traffic management of data transported via an optical fibre connectable to the pluggable module which provides at least one embedded communication channel which exchanges performance monitoring data and configuration data between the pluggable module and a far end device.

The invention further provides a host device comprising at least one interface card connected to a backplane of the host device, wherein said interface card comprises at least one cage for receiving a pluggable module which provides at least one embedded communication channel which exchanges performance monitoring data and configuration data between the pluggable module and a far end device.

The invention further provides a data transport system for transporting bidirectional optical data via at least one optical fibre, wherein at both ends of the optical fibre a pluggable module is attachable which provides at least one embedded communication channel which exchanges performance monitoring data and configuration data between the pluggable module and a far end device.

The invention further provides a method for bidirectional transport of data between host devices of a network via at least one optical fibre, wherein a pluggable module attachable to said optical fibre is connected to a corresponding cage of one of the host devices and a traffic management is performed during transport of the data by the pluggable module which provides at least one embedded communication channel which exchanges performance monitoring data and configuration data between the pluggable module and a far end device.

The invention further provides a computer program comprising instructions for performing a bidirectional transport of data between host devices of a network via at least one optical fibre, wherein a pluggable module attachable to the optical fibre is connected to a corresponding cage of one of the host devices and a traffic management is performed during transport of the data by the pluggable module which provides at least one embedded communication channel (ECC) which exchanges performance monitoring data and configuration data between the pluggable module and a far end device.

The invention further provides a data carrier for storing a computer program comprising instructions for performing a bidirectional transport of data between host devices of a network via at least one optical fibre, wherein a pluggable module attachable to the optical fibre is connected to a corresponding cage of one of the host devices and a traffic management is performed during transport of the data by the pluggable module which provides at least one embedded communication channel ECC which exchanges performance monitoring data and configuration data between the pluggable module and a far end device.

BRIEF DESCRIPTION OF THE DRAWINGS

In the following, embodiments of the method and system according to the present invention are described with reference to the enclosed figures.

FIG. 8 shows an embodiment of a transport data system according to an embodiment of the present invention.

FIGS. 9A-9K show different embodiments of a pluggable module according to the present invention.

FIG. 15 shows a memory section within the memory shown in FIG. 14.

FIGS. 16A-16D show block diagrams of possible embodiments of the pluggable module according to the present invention.

FIGS. 17, 17A, 17B show examples of data structures of a memory within possible embodiments of the pluggable module according to the present invention.

FIGS. 18A, 18B illustrate possibilities of line attenuation measurements performed by the pluggable module according to the present invention.

DETAILED DESCRIPTION OF EMBODIMENTS

Figure 5:
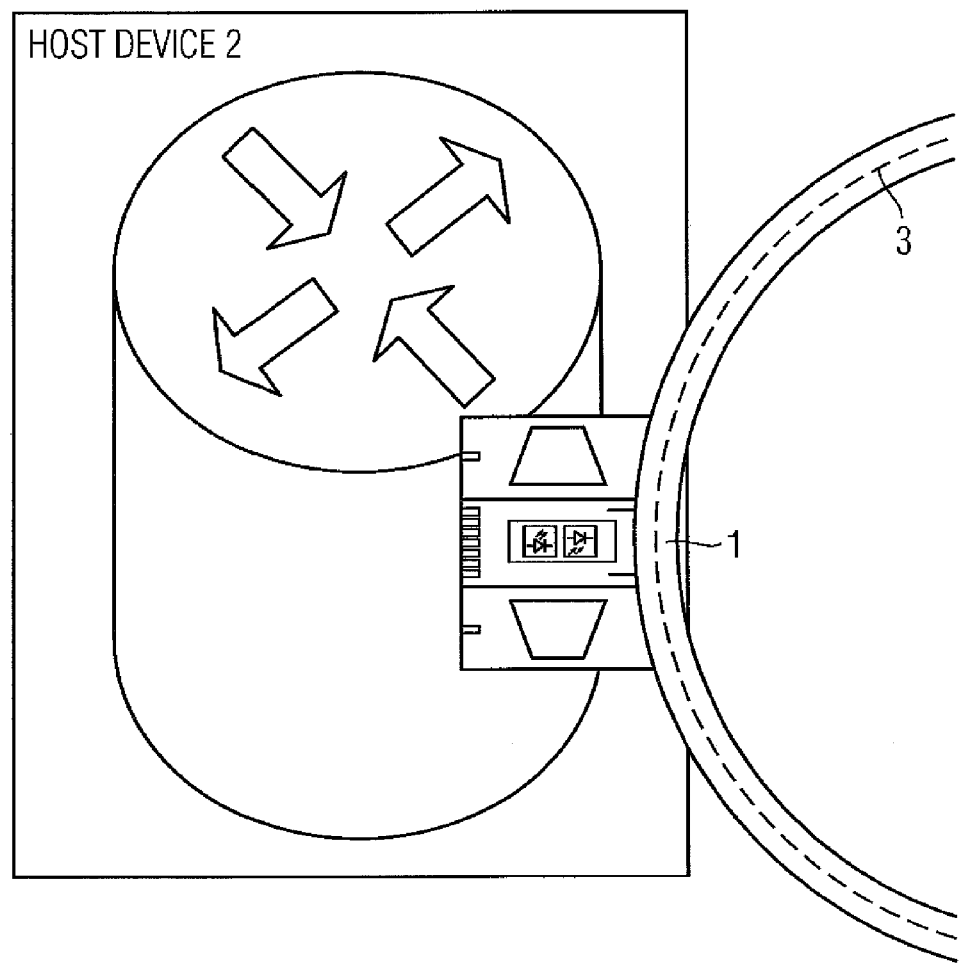
FIG. 5 shows a block diagram of a host device with a plugged in pluggable module according to the present invention.

As can be seen from FIG. 5 a pluggable module 1 as used in a data transport system according to the present invention is plugged into a cage of a host device 2. The host device 2 can be a switching device, such as a router, a bridge, an Ethernet bridge or a fibre channel switch. The module 1 as shown in FIG. 5 is adapted to be plugged into a corresponding cage of the host device 2 and performs a traffic management of data which is transported bidirectionally via at least one optical fibre 3 between host devices 2 of a data network.

Traffic management comprises the provision of an Embedded Communication Channel (ECC), reporting of DMI data via said Embedded Communication Channel, digital performance monitoring, Latency measurements, performing of link tests, protocol mapping time-slot based ADM, asymmetric TDM as well as optical signal processing.

The traffic management of the data is performed within the pluggable module 1 and can be either performed in the electrical domain or in the optical domain. The pluggable module 1 as shown in FIG. 5 comprises an SFP (small form factor) pluggable module and also supports digital monitoring functions according to SFF 8472. The pluggable module 1 according to the present invention does not only perform transceiver functions, i.e. conversion between the optical and electrical domain, but also data traffic management functions. The data traffic management is performed by the pluggable module 1 as a near end and far end traffic management of the transported data. The data traffic management is formed by a pluggable module 1 on the basis of the communication between the pluggable module 1 and different host devices 2 of the optical network. In a possible embodiment, the communication is using a SFF 8742-programming page structure with no adaptions. In further embodiments, the traffic management can be based on a communication between the pluggable module 1 and host devices 2, wherein the communication is using a SFF 8742-programming page structure with no adaptions and a time division multiplex update procedure to buffer additional near end or far end parameters within the provided SFF 8742-programming page structure. In an alternative embodiment, the traffic management can be based on a communication between the pluggable module 1 and host devices 2, wherein the communication is using a SFF 8742-programming page structure with additional address spaces. The traffic management can be based on a communication between the pluggable module 1 as shown in FIG. 5 and a far end pluggable module which is attached to a remote end of the optical fibre 3 as shown in FIG. 5. The pluggable module 1 as shown in FIG. 5 comprises several transport management functionalities, such as protection switching, performance monitoring, OAM, DCN (Data Communication Network), mapping and framing, amplification, reconfigurable optical add/drop multiplexing (ROADM) and dispersion compensation DC. Further traffic management functionalities can comprise an optical transmission impairment mitigation, such as amplification and chromatic polarization mode compensation.

A traffic management functionality provided by a pluggable module 1 according to the present invention is electrical transmission and impairment mitigation with forward error correction and electronic dispersion compensation.

A further traffic management functionality of the pluggable module 1 according to the present invention can be in one embodiment OAM (operation administration and maintenance) functionalities, such as performance monitoring, default management, inter-device communication, configuration management and security management.

In a possible embodiment, the pluggable module 1 according to the present invention comprises optical and/or electrical add/drop multiplexing functionalities. Furthermore, in a possible embodiment, the traffic management functionality of the pluggable module 1 comprises optical conversion with mapping and framing functions. The pluggable module 1 complies in a possible embodiment with existing MSA-agreements, such as SFP, SFP+, XFP, GBIC etc.

Figure 6:
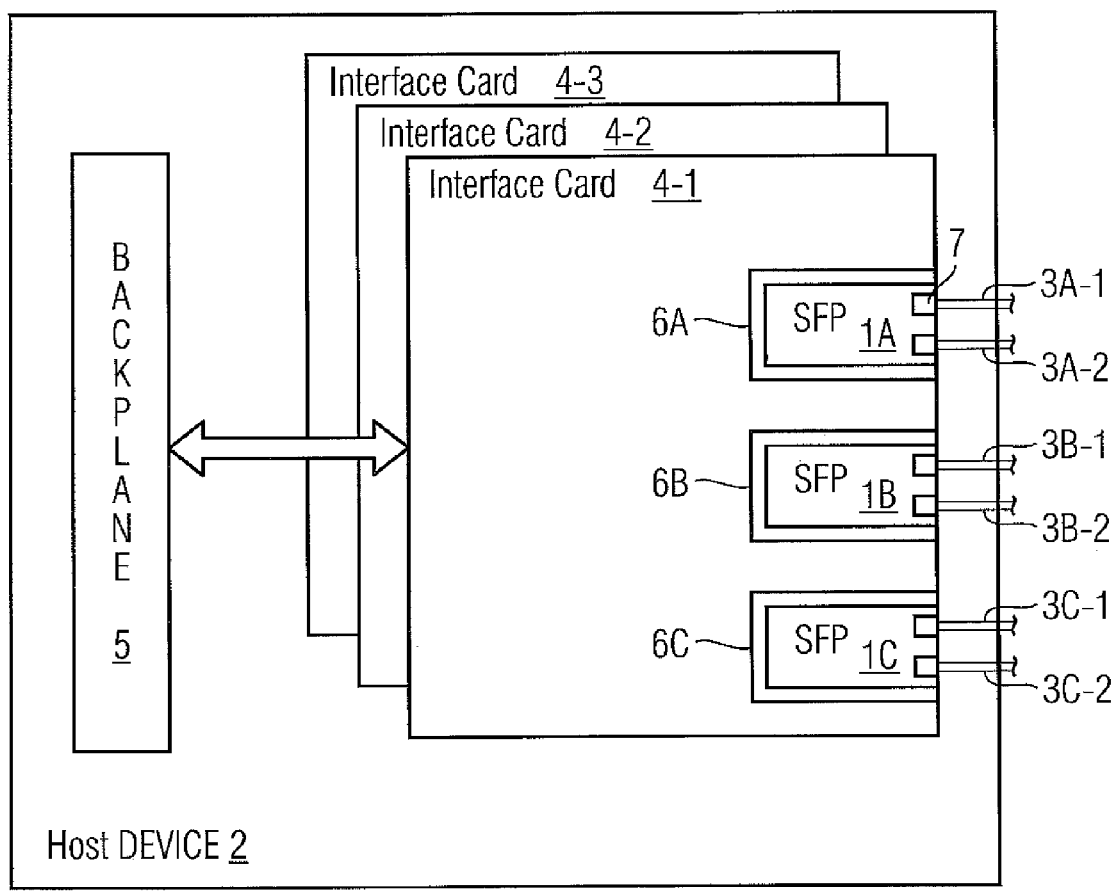
FIG. 6 shows a block diagram of a host device according to an embodiment of the present invention.

FIG. 6 shows a possible embodiment of a host device 2 according to the present invention. The host device 2 comprises at least one interface card 4 connected to a common backplane 5 of the host device 2. Each interface card 4 comprises several cages 6 for receiving pluggable modules 1 according to the present invention. In the given example of FIG. 6, the interface card 4-1 comprises three cages 6A, 6B, 6C for receiving a corresponding SFP pluggable modules 1A, 1B, 1C. Each pluggable module 1 comprises on the front side an optical interface 7 to at least one optical fibre 3. In the given example, each SFP plug-in module 1 as shown in FIG. 6 comprises an interface with two optical fibres for bidirectional optical transport of data. On the rear side, each pluggable module 1 comprises at least an electrical interface for connecting the pluggable module 1 with the circuitry on the interface card 4 of the host device 2.

Figure 7:
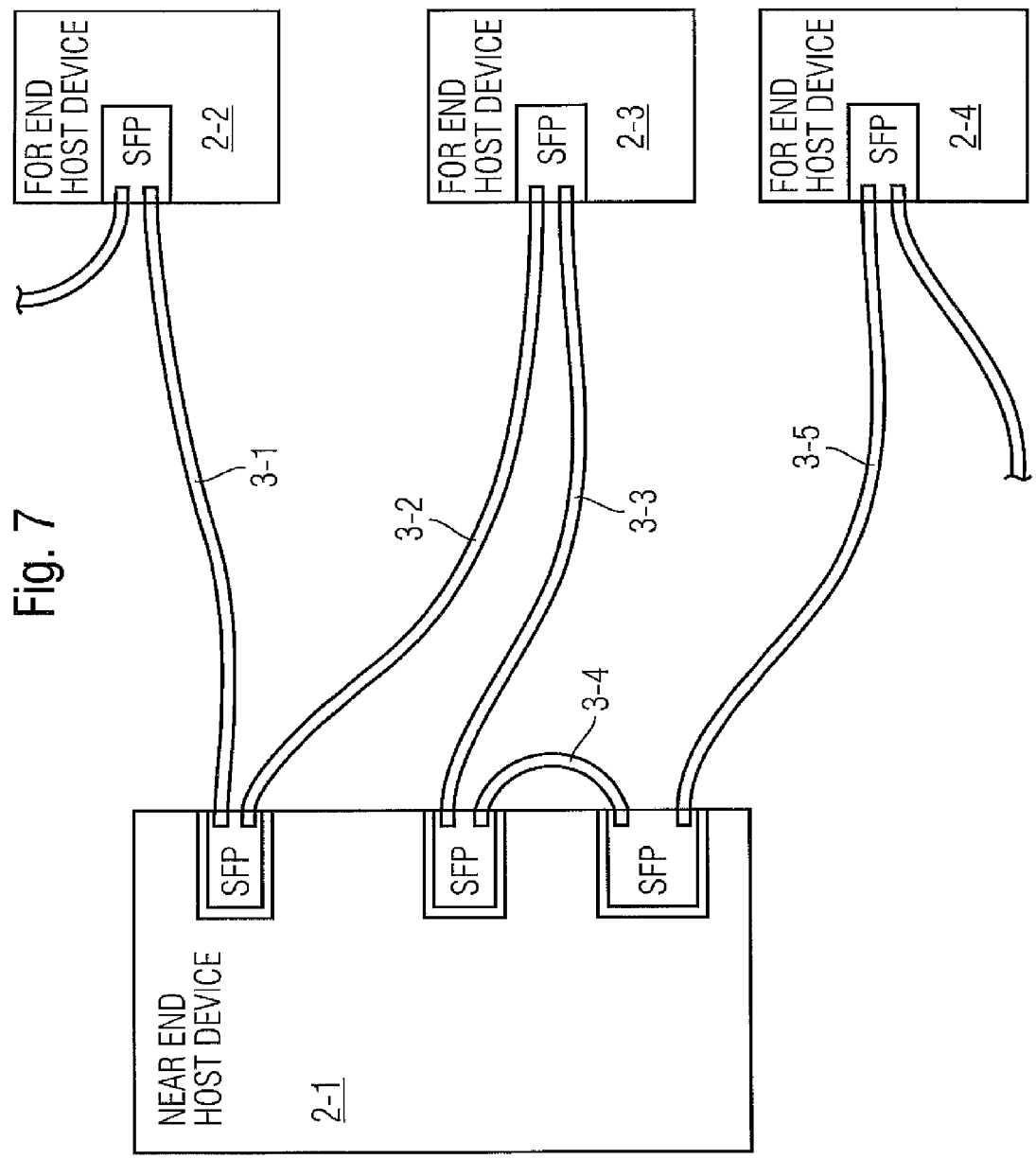
FIG. 7 shows an exemplary arrangement of host devices connected to each other by means of a data transport system according to a possible embodiment of the present invention.

FIG. 7 shows an example for connecting host devices 2 of a network via pluggable modules 1 according to the present invention. In the given example, a near end host device 2-1 can be connected via data transport systems to far end host devices 2-2, 2-3, 2-4. Each data transport system is provided for transporting bidirectional optical data via at least one optical fibre 3. At both ends of the optical fibre 3, a pluggable SFP-module 1 is attached and performs a traffic management of the transported data. The pluggable module 1 provides at least one embedded communication channel (ECC) which exchanges performance monitoring data (PMD) and configuration data (CD) between said pluggable module 1 and a far end device.

FIG. 8 shows a possible embodiment of a data transport system for transporting bidirectional optical data according to the present invention. As shown in FIG. 8, two pluggable modules 1A, 1B are attached via an optical interface to at least one optical fibre 3 connecting both modules. In a possible embodiment, at least one of the pluggable modules 1A, 1B is capable of performing a data traffic management. In a possible embodiment, both pluggable modules are formed by SFP-modules connected to each other via optical fibres 3.

As can be seen from FIG. 7, with the data transport system according to the present invention as shown in FIG. 8, it is possible to connect a near end host device 2-1 to a far end host device. It is also possible to wire the near end host device 2-1, for example via an optical fibre 3-4 as shown in FIG. 7. As can be seen from FIG. 7, the network according to the present invention has the advantage when compared to the conventional system of FIG. 4 that a separate transport system device in a separate box is no longer necessary so that wiring host devices 2 within the network is much easier and more flexible. Since the separate transport system device is no longer necessary, the optical network using the pluggable modules 1 according to the present invention needs less space and is more transparent to users performing the wiring between the host devices 2.

Figure 1:
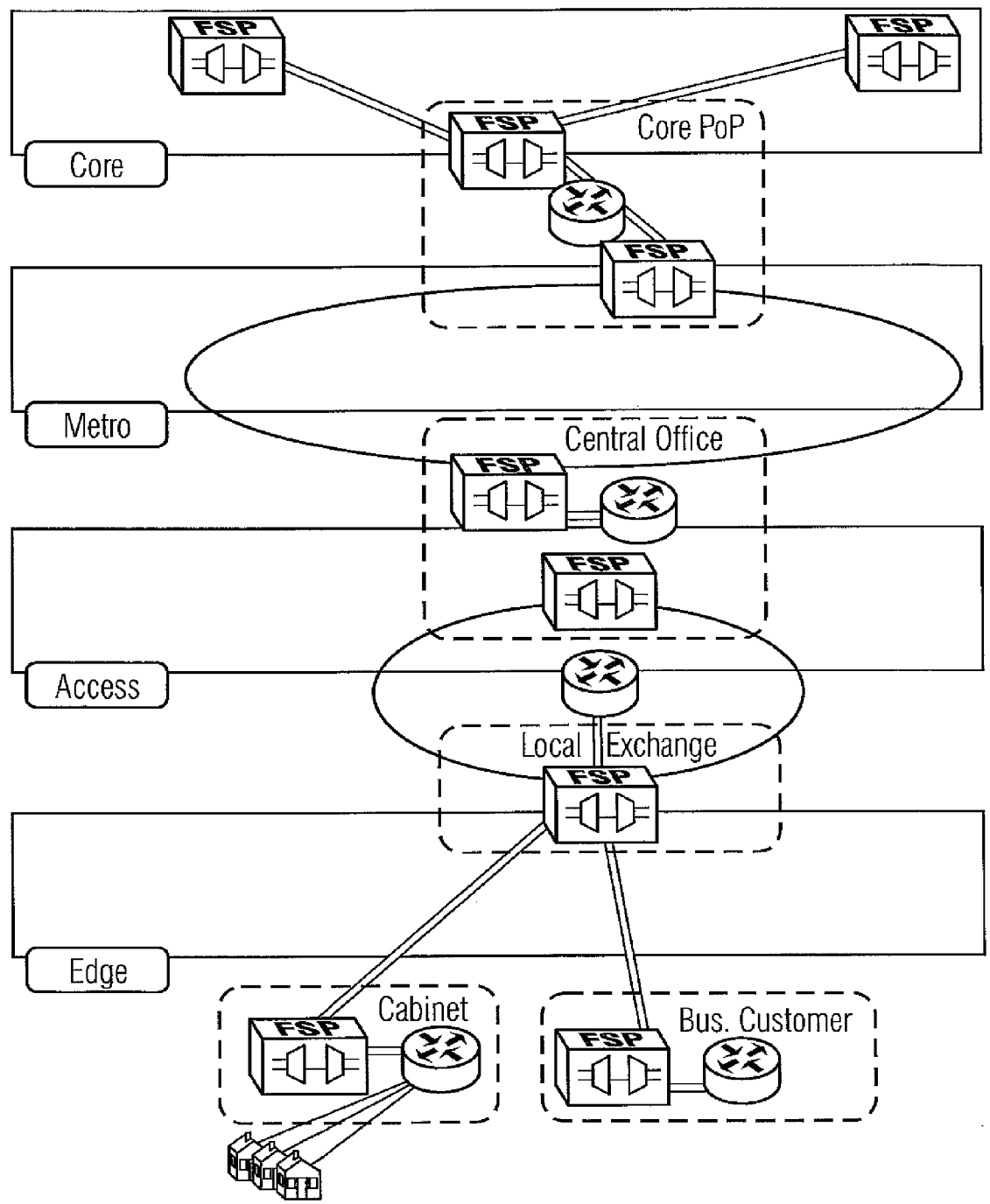
FIG. 1 shows an architecture of a hierarchical network according to the state of the art.
Figure 2:
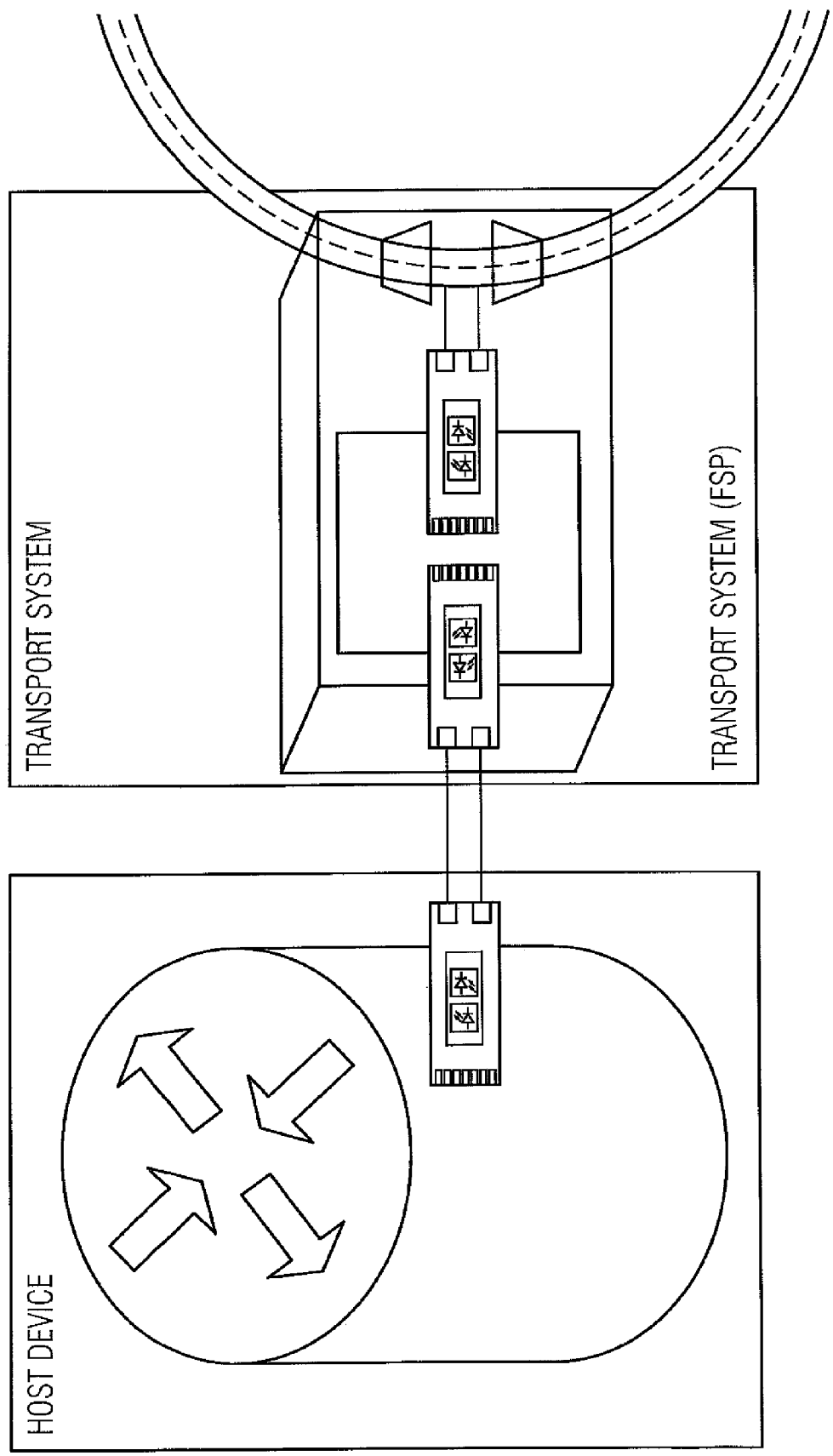
FIG. 2 shows an arrangement of a host device and a transport system according to the state of the art.
Figure 3:
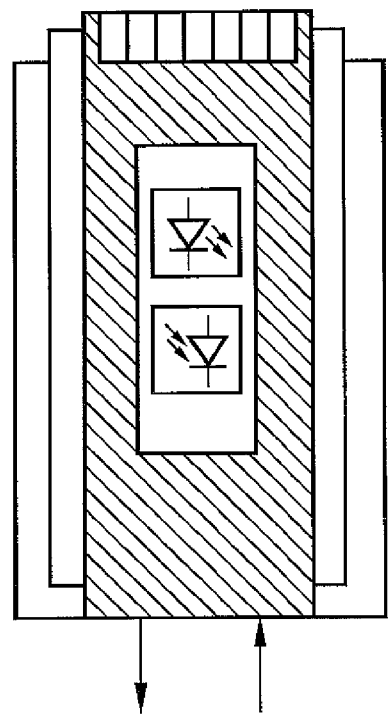
FIG. 3 shows a conventional FSP-module with a transceiver according to the state of the art.
Figure 4:
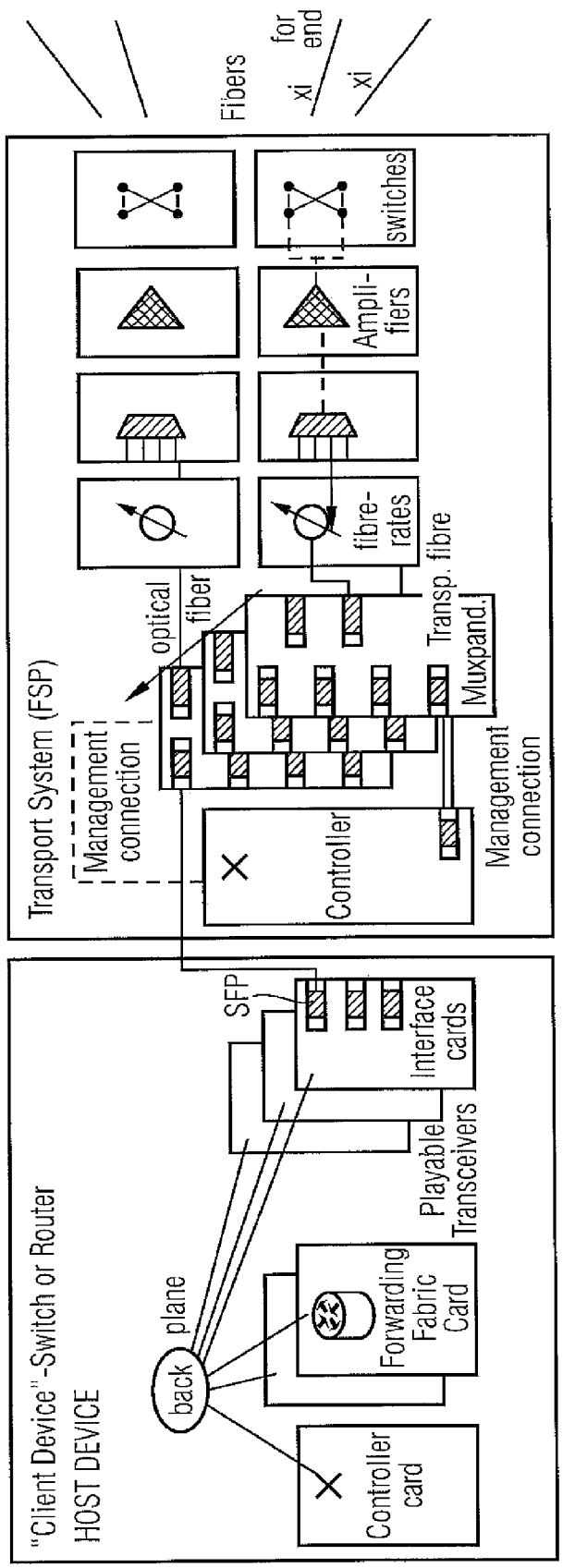
FIG. 4 shows an arrangement of a host device and a transport system according to the state of the art for illustrating the problem underlying the present invention.

A further major advantage of the optical network using the pluggable modules 1 according to the present invention resides in that the number of domain conversions between the electrical and optical domain is minimized. For the transport of data from one host device 2 to another host device 2 only one conversion on the near end side and one conversion on the far end side has to be performed. In contrast, the conventional network as shown in FIG. 4 needs three domain conversions on each side.

FIGS. 9A-9K show different embodiments of a pluggable module 1 according to the present invention. The pluggable module 1 comprises at least one optical interface 7 on the front side and an electrical interface 8 on the rear side. The electrical interface 8 comprises several electrical contacts for connecting the pluggable module 1 with the circuitry of a motherboard by inserting the pluggable module 1 into a corresponding cage 6 mounted on the mother board.

In the embodiment as shown in FIG. 9A, the pluggable module 1 comprises an unidirectional single amplifier 9 within the pluggable module 1.

The electrical interface 8 on the rear side of the pluggable module 1 can be formed by an $I^2C$ bus. On the front side of the pluggable module 1, there are attached two optical fibres 3-1, 3-2, one for receiving an optical signal and one for transmitting an optical signal.

In the embodiment as shown in FIG. 9B the pluggable module 1 comprises a bidirectional signal amplifier 10, wherein each optical fibre 3-1, 3-2 transports data in both directions.

Figure 9E:
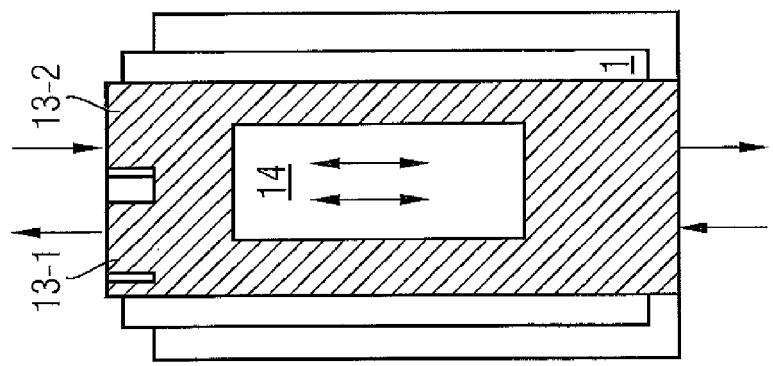
Figure 9D:
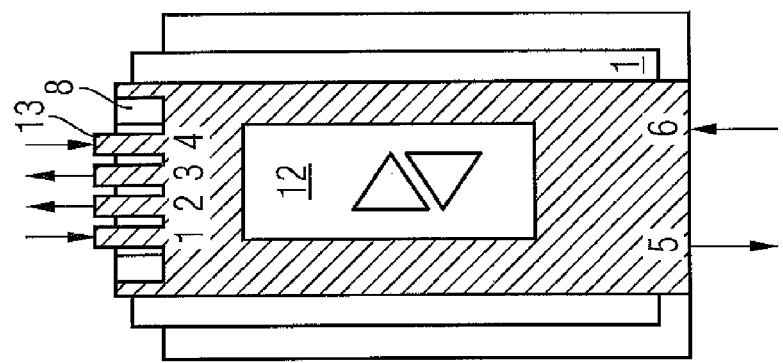
Figure 9C:
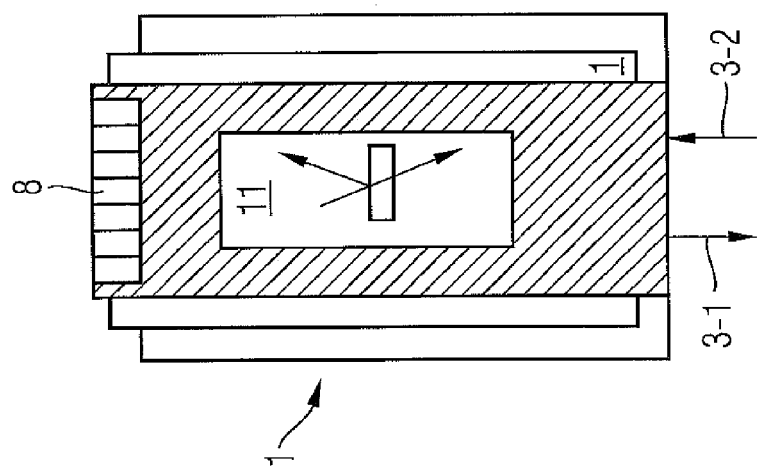

In the embodiment as shown in FIG. 9C the pluggable module 1 comprises a blocking filter 11 which can be either unidirectional or bidirectional. The blocking filter 11 can, for example block signals with different wavelength λ with the exception of a predetermined wave length. FIG. 9C shows a unidirectional blocking filter.

FIG. 9D shows a further embodiment of the pluggable module 1 according to the present invention. In the embodiment of FIG. 9D the pluggable module 1 comprises an OADM (Optical Add Drop Multiplexer)-filter 12 which is either unidirectional or bidirectional. FIG. 9D shows an unidirectional OADM-filter 12. As can be seen from FIG. 9D the pluggable module 1 has on the rear side not only an electrical interface 8 but also additional optical backplane plugs 13. In the given example, the module 1 comprises four optical backplane plugs 13. As can be seen from FIG. 9D the pluggable module 1 comprises six optical ports, i.e. four optical ports on the back side and two optical ports on the front side.

FIG. 9E shows a further embodiment of the pluggable module 1 according to the present invention. In the embodiment as shown in FIG. 9E the pluggable module 1 comprises a connector plug 14, which can be either unidirectional or bidirectional. FIG. 9E shows an unidirectional connector plug 14. The pluggable module 1 as shown in FIG. 9E connects the signals to the backplane of the host device 2 optically. To achieve this, the pluggable module 1 comprises optical backplane plugs 13-1, 13-2 as shown in FIG. 9E.

Figure 9I:
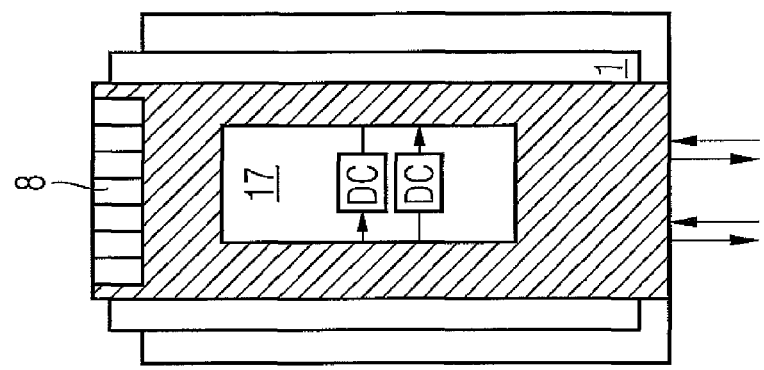
Figure 9H:
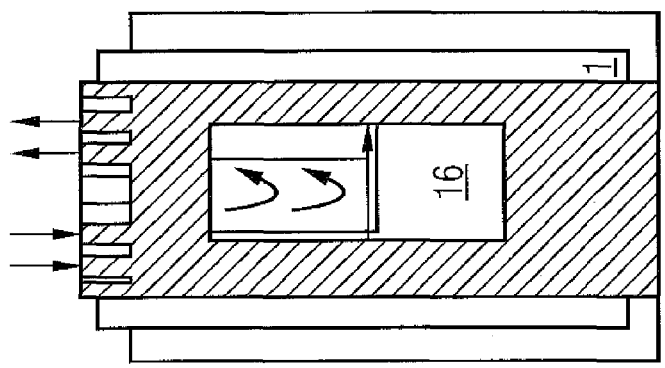
Figure 9F:
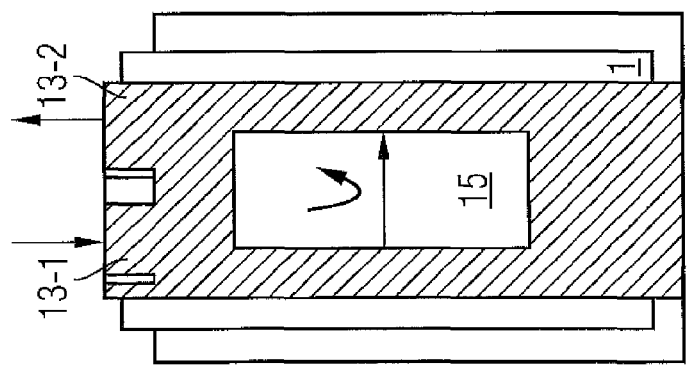

FIG. 9F shows a further embodiment of the pluggable module 1 according to the present invention. In this embodiment, the pluggable module 1 comprises a loop plug 15. The loop plug 15 can be either unidirectional or bidirectional. FIG. 9F shows a unidirectional loop plug. In the given embodiment as shown in FIG. 9F the pluggable module 1 does not comprise connectors on the front side. The loop plug 15 uses unused slots or connectors on the backside of the pluggable module 1. The loop can be either an electrical loop or an optical loop. In the example of FIG. 9F two backplane optical plugs 13-1, 13-2 form an optical loop.

FIG. 9H shows a further embodiment of the pluggable module 1 according to the present invention. In the shown embodiment the pluggable module 1 comprises a double-loop plug 16 which loops unused slots on the back side of the pluggable module 1. In the embodiment as shown in FIG. 9F no front connectors are provided. The embodiments as shown in FIGS. 9F, 9H can be used for providing loops within a host device 2.

FIG. 9I shows a further embodiment of a pluggable module 1 according to the present invention. In the shown embodiment, the pluggable module 1 comprises a dispersion compensation plug 17. The dispersion compensation plug 17 can be either unidirectional or bidirectional. FIG. 9I shows a bidirectional dispersion compensation plug 17 within the pluggable module 1. The dispersion compensation unit DC can be, for example formed by a fibre bragg grating.

Figure 9J:
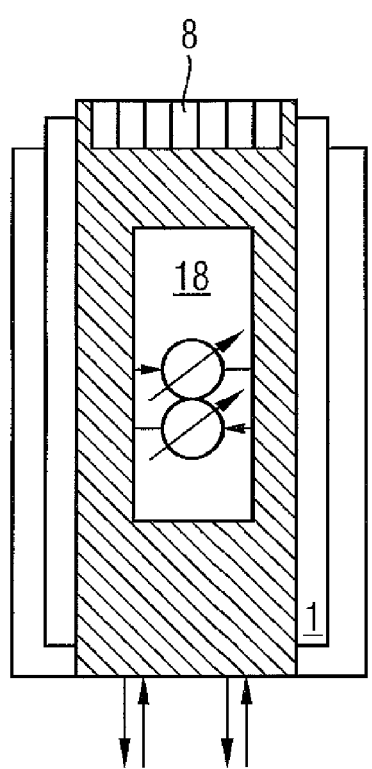

FIG. 9J shows a further embodiment of the pluggable module 1 according to the present invention. In the embodiment as shown in FIG. 9J the pluggable module 1 is formed by a variable optical attenuator VOA 18. The variable optical attenuator 18 can be either unidirectional or bidirectional. FIG. 9J shows a bidirectional variable optical attenuator 18.

Figure 9K:
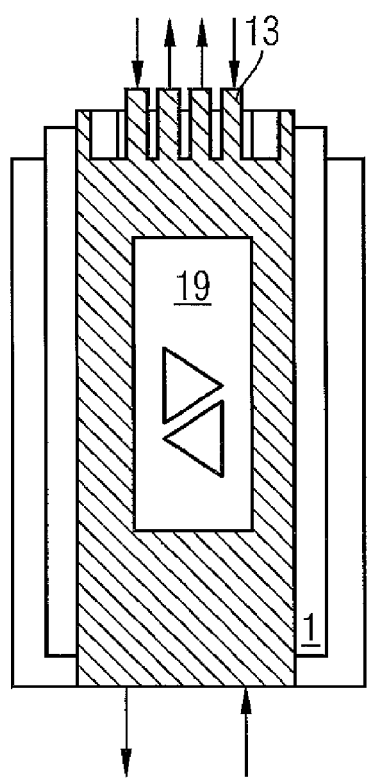

FIG. 9K shows in a further embodiment of the pluggable module 1 according to the present invention. In the shown embodiment the pluggable module 1 comprises a power splitter 19. The power splitter 19 can be either unidirectional or bidirectional. FIG. 9K shows a unidirectional power splitter. In the given example of FIG. 9K the pluggable module 1 comprises six ports, for example port 1 may have 100%, port 5 x %, port 2 100–x % of the power and port 3, 6, 4 may have an identical signal but with other direction.

Figure 10:
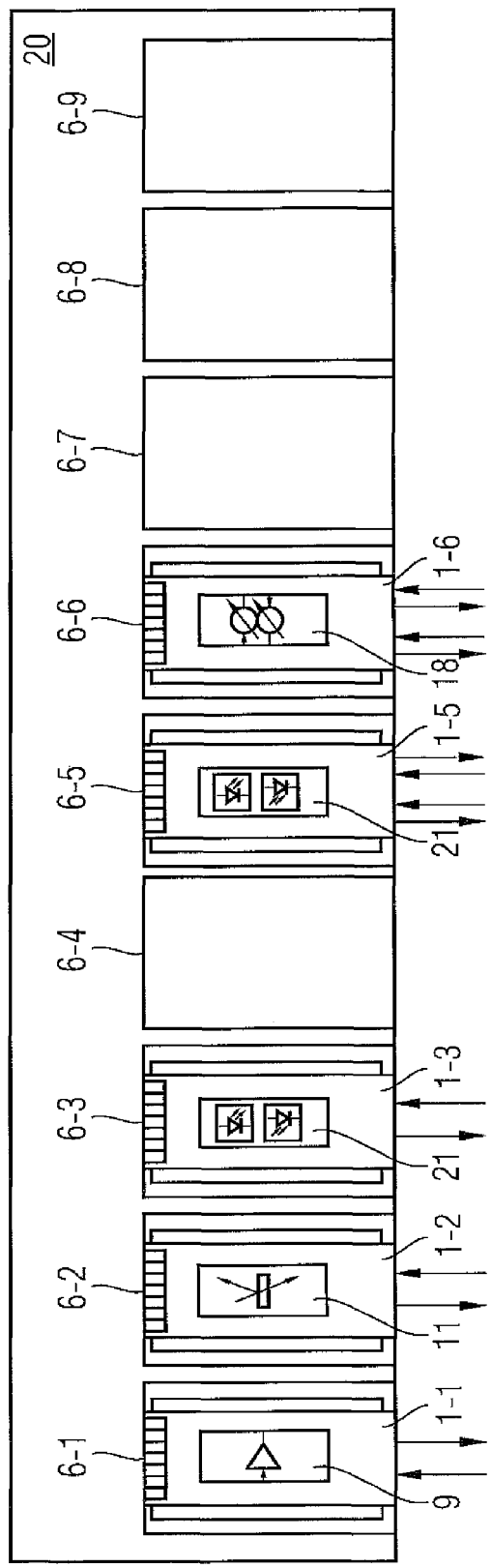
FIG. 10 shows an embodiment of an interface card as employed by a host device according to a possible embodiment of the present invention.

The host device 2 as shown in FIG. 6 may comprise in a possible embodiment an optical interface card 20 for several pluggable modules 1 according to the present invention as shown in FIG. 10. In the given example of FIG. 10, different pluggable modules 1 are plugged into a corresponding cage 6 of the interface card 20 of a host device 2. The interface card 20 comprises in the given example nine cages 6-1 to 6-9 each provided for receiving a corresponding pluggable module 1. In the given example of FIG. 10 the pluggable modules 1-1, 1-2, 1-3, 1-5 and 1-6 are plugged into the corresponding cages 6 of the interface card 20. In the given example the pluggable module 1-1 comprises an unidirectional amplifier 9, the second pluggable module 1-2 comprises a blocking filter 11 and the third pluggable module 1-3 is formed by a transceiver 21. The pluggable module 1-5 is also formed by a transceiver and the pluggable module 1-6 shown in FIG. 10 is formed by a variable optical attenuator VOA 18. The cages 6-4, 6-7, 6-8, 6-9 of the cartridge 20 are empty in the given example of FIG. 10.

Figure 11:
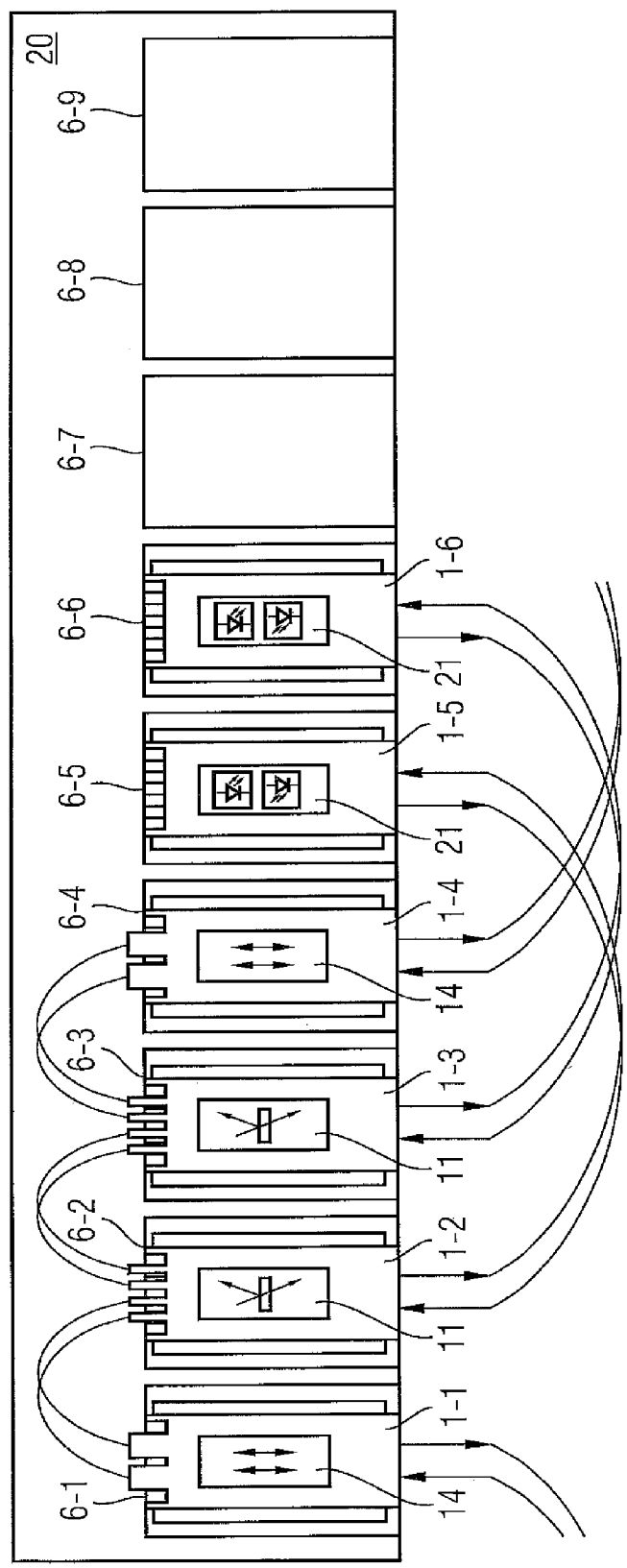
FIG. 11 shows an interface card of a host device with plugged in modules according to the present invention.

FIG. 11 shows a further example of a interface card 20 showing two wave lengths OADM. In the given example the first six cages 6-1 to 6-6 of the interface card 20 are occupied by plugged in pluggable modules 1-1 to 1-6. In the given example the first pluggable module 1-1 comprises a connector plug 14, the second pluggable module 1-2 comprises a blocking filter 11, the third pluggable module 1-3 comprises also a blocking filter 11, the fourth pluggable module 1-4 comprises a connector plug 14, the fifth pluggable module 1-5 is formed by a transceiver 21 and the sixth pluggable module 1-6 also comprises a transceiver 21.

Figure 12:
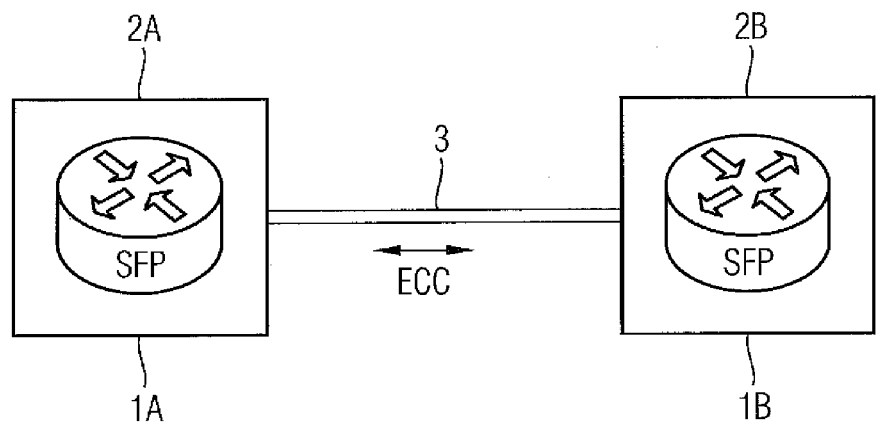
FIG. 12 shows a diagram for illustrating an embedded communication channel which is provided by a pluggable module according to an embodiment of the present invention.

In a preferred embodiment of the pluggable module 1 according to the present invention, the pluggable module 1 comprises an embedded communication channel ECC as illustrated by FIG. 12. The embedded communication channel ECC is provided between two pluggable modules 1A, 1B and is provided for exchanging configuration data, management data, administrative data and performance monitoring data between the near end pluggable module 1A and a far end pluggable module 1B. In a possible embodiment the embedded communication channel ECC is implemented at a physical layer. The embedded communication channel ECC can be provided by amplitude shift keying (ASK), frequency shift keying (FSK) or phase shift keying (PSK). In a possible embodiment the embedded communication channel ECC is provided by side band modulation of a data signal of transported data. In a possible embodiment the data signal is pulse amplitude modulated.

In a further embodiment the embedded communication channel ECC between the pluggable modules 1A, 1B is implemented at a protocol layer. In a possible embodiment the embedded communication channel ECC uses a bandwidth not occupied by a transport protocol for exchanging data between the near end pluggable module 1A and a far end pluggable module 1B.

In a possible embodiment the embedded communication channel ECC is implemented on a proprietary overhead that is generated on top of a transport protocol.

In a further embodiment the embedded communication channel ECC can be implemented based on the overhead of a transport protocol, such as idle data patterns in inter-frame gaps.

In a further embodiment the embedded communication channel ECC can be implemented within a protocol layer, such as an Ethernet protocol. The embedded communication channel ECC can use existing protocol overheads or space in inter-frame gaps which can be implemented inside a protocol layer, such as EFM.

The mapping/demapping of data within the embedded communication channel ECC is performed within the pluggable module 1A, 1B.

The purpose of the provided embedded communication channel ECC is to read performance monitoring data from the far end side, write performance monitoring data to the far end side and to perform topology detection within the network of pluggable modules 1. The embedded communication channel ECC can be provided to read communication data from the far end side and to report to an internal controller of the near end pluggable module 1. With the embedded communication channel ECC it is further possible to write configuration data to the far end pluggable module controller and to allow communication between a near end host device 2A and a far end host device 28 as shown in FIG. 11.

The provision of an embedded communication channel ECC allows remote reporting of diagnostic parameters, such as DMI. Furthermore, it is possible to make remote diagnostics parameters permanently available at a remote side, for example power local, power remote. By using standard SFF 8472 digital diagnostics I/F, it is possible to latch remote data, i.e. store the data in a memory of the pluggable module 1.

There are two main possibilities for implementation of the embedded communication channel ECC. In a physical layer implementation of the embedded communication channel ECC, for example a pilot tone can be used. By using, for example a slow AM modulation scheme (10%, KHz range) available diagnostic I/F data can be imprinted on the embedded communication channel ECC.

In an alternative embodiment, the embedded communication channel ECC can be implemented on a protocol layer. For example, the embedded communication channel ECC can be provided on top of a service protocol. In a possible embodiment, a high speed capable integrated circuit can be provided in a data path to imprint the embedded communication channel ECC. Imprinting of the embedded communication channel ECC can, for example use of inter-frame gaps for creation of an overhead OH. The available digital diagnostic I/F data can be imprinted or transferred on the embedded communication channel ECC.

Figure 13A:
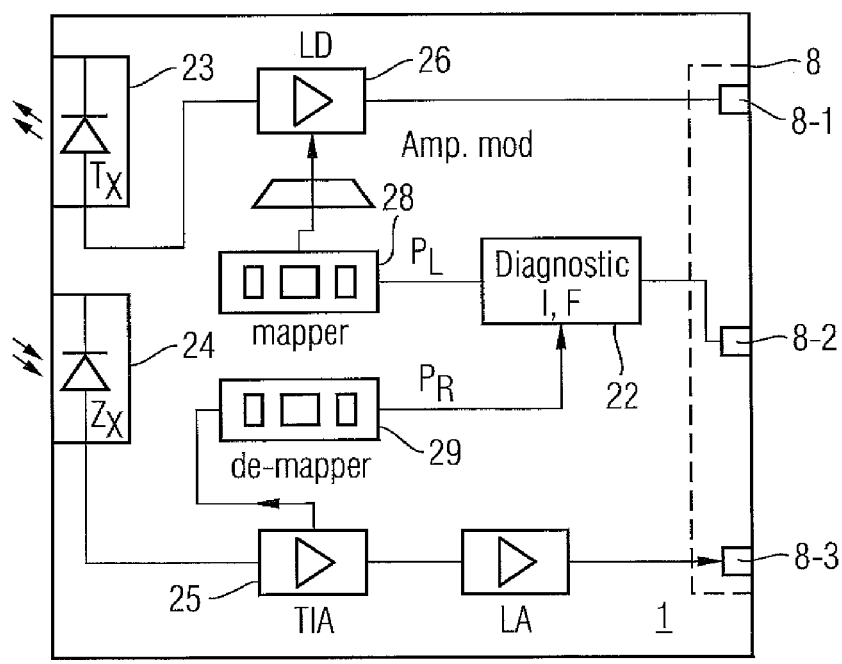
FIGS. 13A, 13B show block diagrams of possible embodiments of a pluggable module according to the present invention.

FIG. 13A shows a possible embodiment for the pluggable module 1 comprising an embedded communication channel ECC. In the shown embodiment, the pluggable module 1 comprises a diagnostic unit 22 to receive local performance data and electronic components within the pluggable module 1. These electronic components comprise in the given example a transmission diode 23, a receiving diode 24, a transimpedance amplifier TIA 25, a laser driver 26 and a limiting or linear amplifier 27. On the backside of the pluggable module 1 the electrical interface 8 comprises a data transmission interface 8-1, an electrical reporting interface 8-2 and for the reception data path an electrical data reception interface 8-3. Furthermore, the pluggable module 1 comprises a mapping unit 28 which controls the laser driver 26 depending on local performance data received from the diagnostic unit 22 to transfer the performance data via the provided embedded communication channel ECC to a remote pluggable module 1.

As can be seen from FIG. 13A, the pluggable module 1 further comprises a demapping unit 29 for storing performance data extracted from the embedded communication channel ECC in a memory of the diagnostic unit 22. The performance data can be extracted, for example at the transimpedance amplifier 25 and the embedded communication channel ECC can be provided by side band modulation of a data signal of the transported data stream. The diagnostic unit 22 receives local performance data from the electronic components 23, 24, 25, 26, 27, such as temperature T or power consumption P. In a possible embodiment, the diagnostic unit 22 reports the received local (near end) performance data and the received remote (far end) performance data transported via the embedded communication channel ECC via the electrical interface 8-2 to a controlling device of the host device 2 into which the pluggable module 1 is inserted. The electrical interface 8-2 can be formed in a possible embodiment by an I$^2$C bus. In a possible embodiment, the performance data extracted at the transimpedance amplifier TIA comprises SFF 8472-performance parameters. In a possible embodiment, the diagnostic unit 22 comprises a memory for storing local performance monitoring data of the pluggable module 1 as well as the received and extracted performance monitoring data of remote pluggable modules.

The provision of at least one embedded communication channel ECC allows an exchange of performance monitoring data PMD and configuration data CD between the pluggable module 1 and a far end device which can be formed also by a pluggable module or by a host device.

The configuration data CD comprises physical device configuration data PHY-CD and transport protocol configuration data TP-CD.

The performance monitoring data PMD can comprise physical monitoring data PHY-PMD and transport protocol performance monitoring data TP-PMD.

The physical performance monitoring data PHY-PMD can comprise in a possible embodiment transmit power data TXPOWER, reception power data RXPOWER, supply voltage data VCC, temperature data T or bias voltage data TXBIAS.

The transport protocol performance monitoring date TP-PMD can comprise in a possible embodiment bit error rate indication data BER, corrected or uncorrected forward error correction indication data FEC, code violation indication data CV and frame drop indication data.

Figure 26:
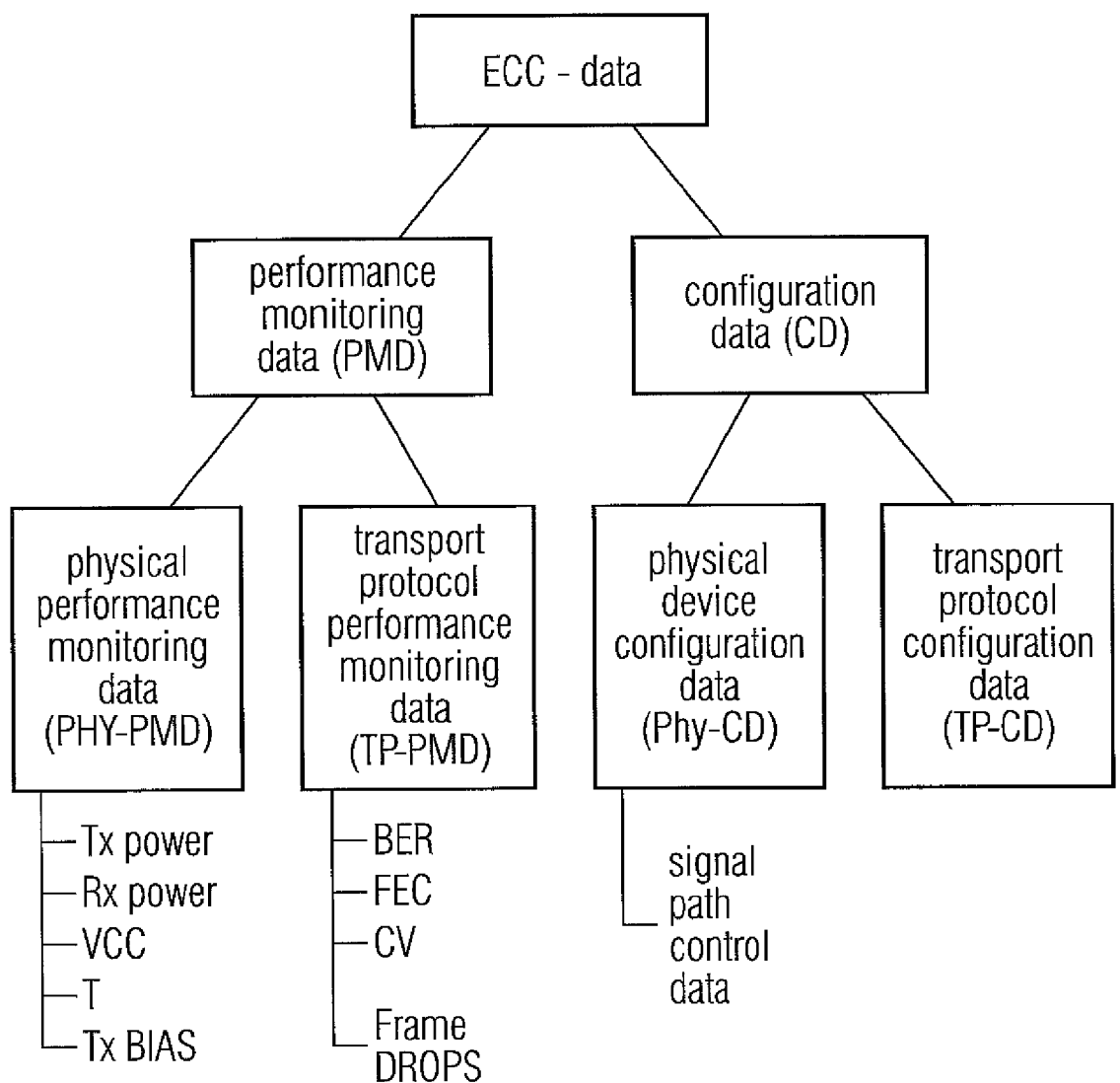
FIG. 26 shows a diagram for illustrating different kinds of data which are exchanged by means of an embedded communication channel (ECC) as provided within a data transport system according to the present invention.

FIG. 26 shows a diagram for illustrating data which can be transported via the embedded communication channel ECC as employed by the system according to the present invention.

In a possible embodiment of the network according to the present invention the near end pluggable module 1 is provided with near end transport protocol parameters detected at the near end puggable module 1, with far end transport protocol parameters detected at the far end device and with far end physical performance monitoring data of the far end device. The far end device can be formed by an another pluggable module or a host device.

In a possible embodiment of the network according to the present invention the near end pluggable module 1 is provided via the embedded communication channel ECC with configuration data for near end protocol parameters, configuration data for far end protocol parameters and with configuration data for far end physical device parameters.

Accordingly, the embedded communication channel ECC as implemented in the network according to the present invention allows a far end plug monitoring as well as a far end plug configuration. Furthermore, the provision of an embedded communication channel ECC allows far end host monitoring of a far end host device and a far end configuration of the far end host device by a near end host device. Furthermore, the provision of an embedded communication channel ECC according to the present invention allows a plug-to-plug monitoring and a plug-to-plug configuration.

In a possible embodiment two pluggable modules, i.e. a near end pluggable module 1 and a far end pluggable module 1 which communicate with each other via an embedded communication channel ECC over an optical fibre 3 can update and synchronize their respective software programs.

Figure 13B:
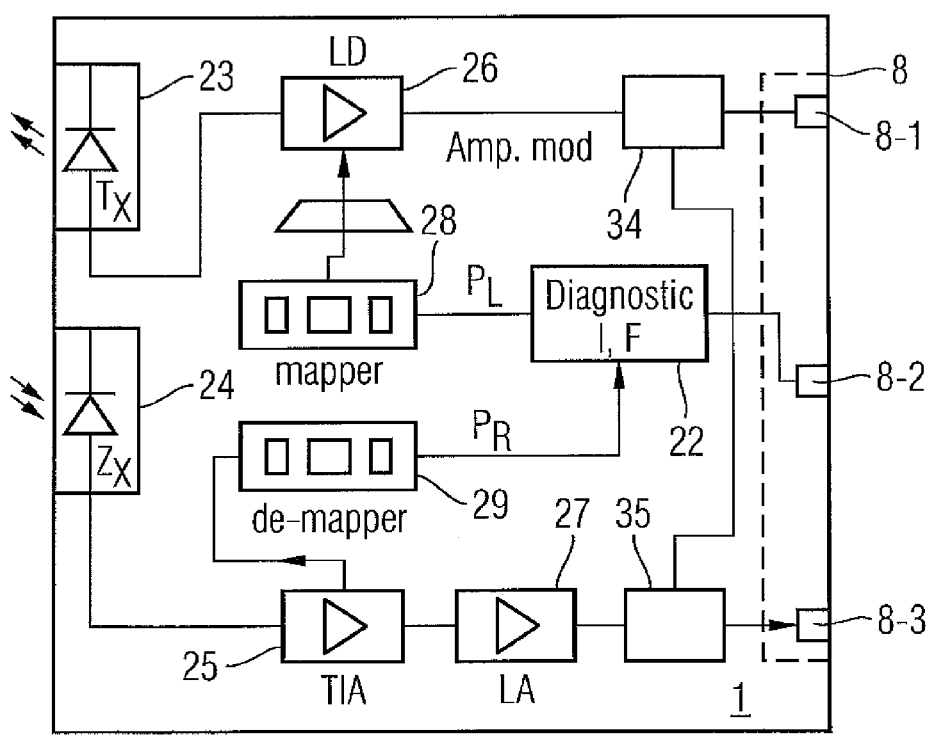

FIG. 13B shows a further embodiment of a pluggable module 1 according to the present invention. In the embodiment shown in FIG. 13B the pluggable module 1 comprises signal path switches 34, 35. As can be seen in FIG. 13B a signal path switch 34 is provided in the transmitting signal path of the pluggable module 1 and a signal path switch 35 is provided in the receiving signal path of the pluggable module 1.

In a possible embodiment the physical device configuration data PHY-CD exchanged between the near end pluggable module 1 and the far end device near via the embedded communication channel ECC comprises signal path control data for signal path switching in the near end pluggable module 1 and/or the far end device which can also be formed by a pluggable module. The signal path control data controls signal path switches provided in signal paths of the near end pluggable module 1 or of the far end device. Signal path control data can control the signal path switches 34, 35 of the far end pluggable module such that a signal loop is formed.

In a further embodiment the signal path switches can also be implemented by the FPGA 32 as shown in FIGS. 16A, 16C.

Figure 14:
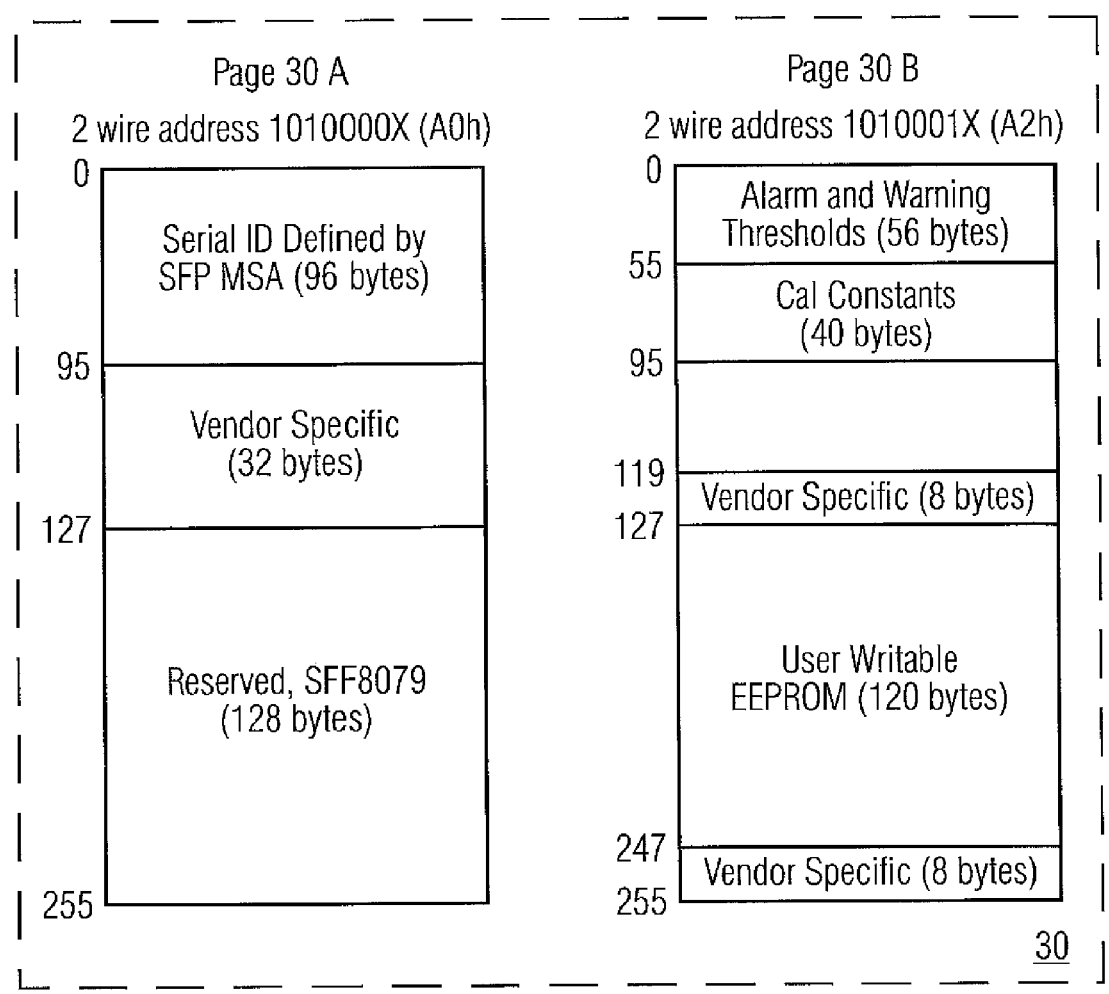
FIG. 14 shows a data structure of a memory within a pluggable module according to a possible embodiment of the present invention.

FIG. 14 shows schematically a memory content of a memory 30 within the diagnostic unit 22 as shown in FIG. 13. In the shown embodiment, the memory 30 is a SSF 8472-memory having a page 30A and a page 30B. As can be seen from FIG. 14, in the SSF 8472-memory unallocated bytes on page 30B are used for exchanging DMI (digital monitoring interface) performance data with a far end pluggable module 1. This memory space can be used for transferring data from the diagnostic unit 22 to the respective host device 2.

FIG. 15 shows the memory space page 30B for storing real time diagnostic interface data in more detail. Data bytes 96-105 are used for local near end parameter data. As can be seen from FIG. 15 data bytes 106-109 are unallocated data which can be used for transferring data via the embedded communication channel FCC to a far end pluggable module. In a possible embodiment, the parameter data is refreshed in a fixed time period interval, such as every five seconds.

In a possible embodiment the performance monitoring data PMD and the configuration data CD transported via the embedded communication channel FCC are exchanged via a storage area of the second page 30B provided for storing dynamic data.

In possible embodiments the data are exchanged via unallocated memory cells of the memory 30 within the diagnostic unit 22 of the near end pluggable module 1 at a reduced transfer rate which is smaller than the refreshing rate of the memory cells of the memory 30. The far end physical performance monitoring parameters can be exchanged in a possible embodiment via the memory cells of the memory 30 within the diagnostic unit 22 of the near end pluggable module at a reduced transfer rate which is half the refresh rate of the memory cells.

Furthermore, the configuration data CD for the far end physical device parameters can be exchanged via the memory cells of the memory 30.

Near end protocol parameters, far end protocol parameters, far end physical parameters can be provided at the near end by means of a digital diagnostic mapping protocol. In a possible embodiment the data is exchanged by means of the memory space provided by memory cells 106 to 109 as shown in FIG. 15.

In a possible embodiment the transfer rate is smaller than the refresh rate of the memory cells and depends on the number of parameters which are transported via memory cells 106 to 109 as shown in FIG. 15.

In a possible embodiment the transfer data rate $R_t$ depends on the refresh rate R of the memory cells and the number N of provided parameters as follows:

$$R_t \leq 2R:N$$

In a further embodiment only the far end physical parameters of the far end device are provided at the near end via the embedded communication channel ECC via the unallocated memory cells 106-109 of the memory 30 as shown in FIG. 15. In this embodiment the transfer data rate $R_t$ can be half the refresh rate R of the memory cells within the memory 30:

$$R_C = R:2$$

Figure 17:
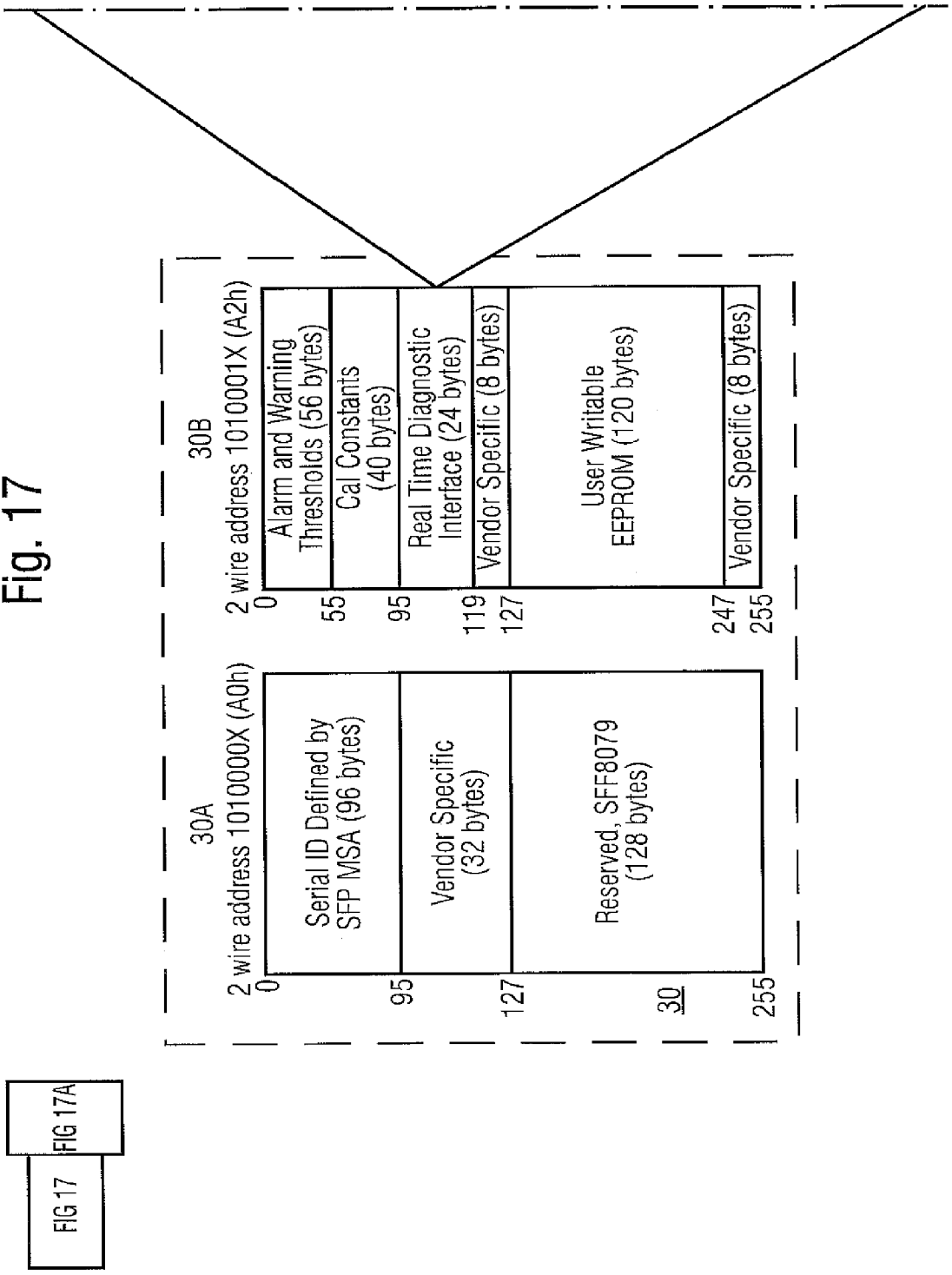
Figure 17B:
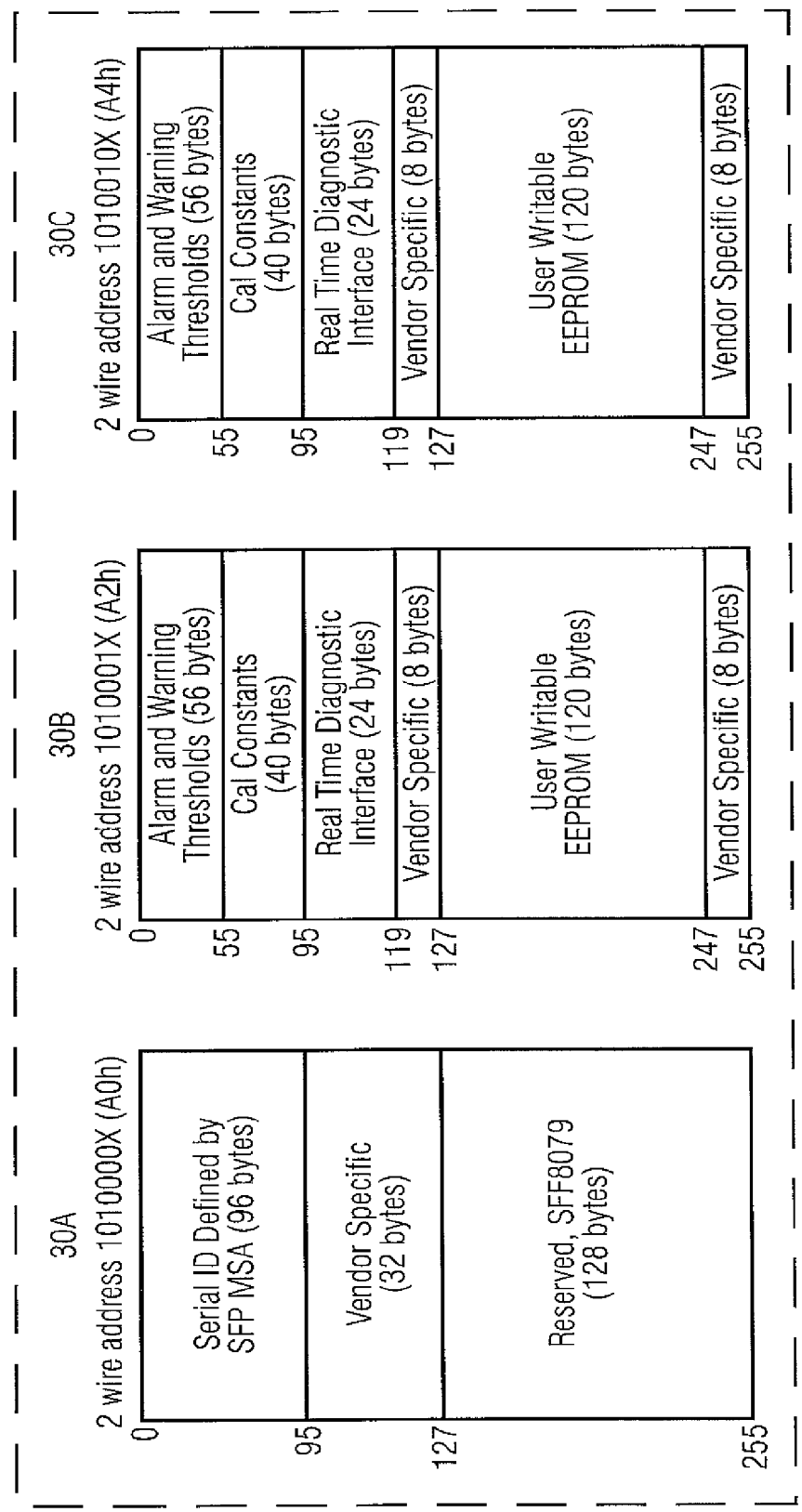

In a further embodiment an additional page 30C can be provided within the memory 30 as shown in FIG. 17B.

Like the performance monitoring data PMD the configuration data CD can be exchanged via unallocated memory cells within the memory 30.

In a further embodiment, configuration data for near end protocol parameters, configuration data for far end protocol parameters and configuration data for far end physical parameters transported via the embedded communication channel ECC are exchanged by means of unallocated memory cells within the memory 30. In a possible embodiment, all configuration data is changed by means of memory cells 106 to 109 shown in FIG. 15. In a possible embodiment, the transfer rate is also reduced and depends on the refresh rate of the memory cells and the number N of parameters to be transported.

As can be seen from FIGS. 13A, 13B, the mapping and demapping units 28, 29 are connected to a SFF 8472-diagnostic unit 22. The near end SSF 8472-data is read and written into the embedded communication channel ECC by the mapping unit 28. The embedded communication channel ECC is read and the far end SFF 8472-parameter data is extracted and written to the near end SFF 8472-unit 22. The data is written to a diagnostic SSF 8472-unit 22 which supports SSF 8472 programming pages, so that address space extensions can be avoided to prevent adaptions of the hardware and software of the host device 2. To meet space constraints within the SSF 8472-address space a proprietary TDM-mapping scheme can be supported to map such data sets into the address space.

In a possible embodiment of the pluggable module 1 according to the present invention, the pluggable module 1 performs near end and far end bidirectional performance monitoring.

FIGS. 16A, 16B show embodiments employing parallel processing using SERDES (serial/deserializer). FIGS. 16C, 16D show embodiments of the pluggable module 1 employing serial processing using high speed FPGA-interfaces. As can be seen from FIG. 16A, a SERDES (seal/deserializer) 31 is provided for supplying data from a transmit data path to data processing circuit 32 such as a field programmable gate array. The data processing circuit 32 can also be formed by an ASIC, EPLD or CPLD. In the embodiments shown in FIGS. 16A, 16C the FPGA 32 can implement also signal path switches forming a loop for a latency measurement. In the embodiments of FIGS. 16B, 16C, the pluggable module 1 comprises separate signal path switches 34, 35.

A further SERDES (serial/deserializer) 33 is provided for supplying data from a reception data path of said pluggable module 1 to the FPGA 32.

The digital performance monitoring is provided for observing data streams. The SERDES 31, 33 are provided for parallizing a high speed signal into a number of low speed data streams.

In the embodiments shown in FIGS. 16C, 16D the SERDES 31, 33 are incorporated in the FPGA 32. In the embodiment shown in FIG. 16A the SERDES 31, 33 are provided within the data path and have high speed in- and out-interfaces for the local speed data streams. In the embodiment as shown in FIG. 16B the SERDES 31 has a high speed in-interface for a signal which is forwarded as a low speed data stream to the FPGA 32. The FPGA 32 as shown in FIGS. 16A, 16B is provided for performing performance monitoring. The FPGA 32 is connected to the diagnostic unit 22 of the pluggable module 1. In a possible embodiment, the FPGA 32 increments at least one performance counter provided in a memory 30 of the diagnostic unit 22 depending on a measured performance indicator. In a possible embodiment, the performance indicator can be formed by a BER (bit error rate), a CV (coding violation) or by frame drops.

FIGS. 17, 17A, 17B show different possibilities to read out data using a memory 30 within the diagnostic unit 22. In the embodiment as illustrated by FIGS. 17 and 17A, free memory space of the memory 30 as shown in FIG. 14 is used to read out data.

In the embodiment as illustrated in FIG. 17B, an additional programming page 30C is provided to read out performance data.

In a possible embodiment, the memory 30 within the diagnostic unit 22 is a SFF 8472-memory comprising unallocated bytes used for an ES (error seconds), a SES (severe error seconds) a UAS (Unavailable Seconds) and a BER (Bit Error Rate) performance counter.

Figure 18A:
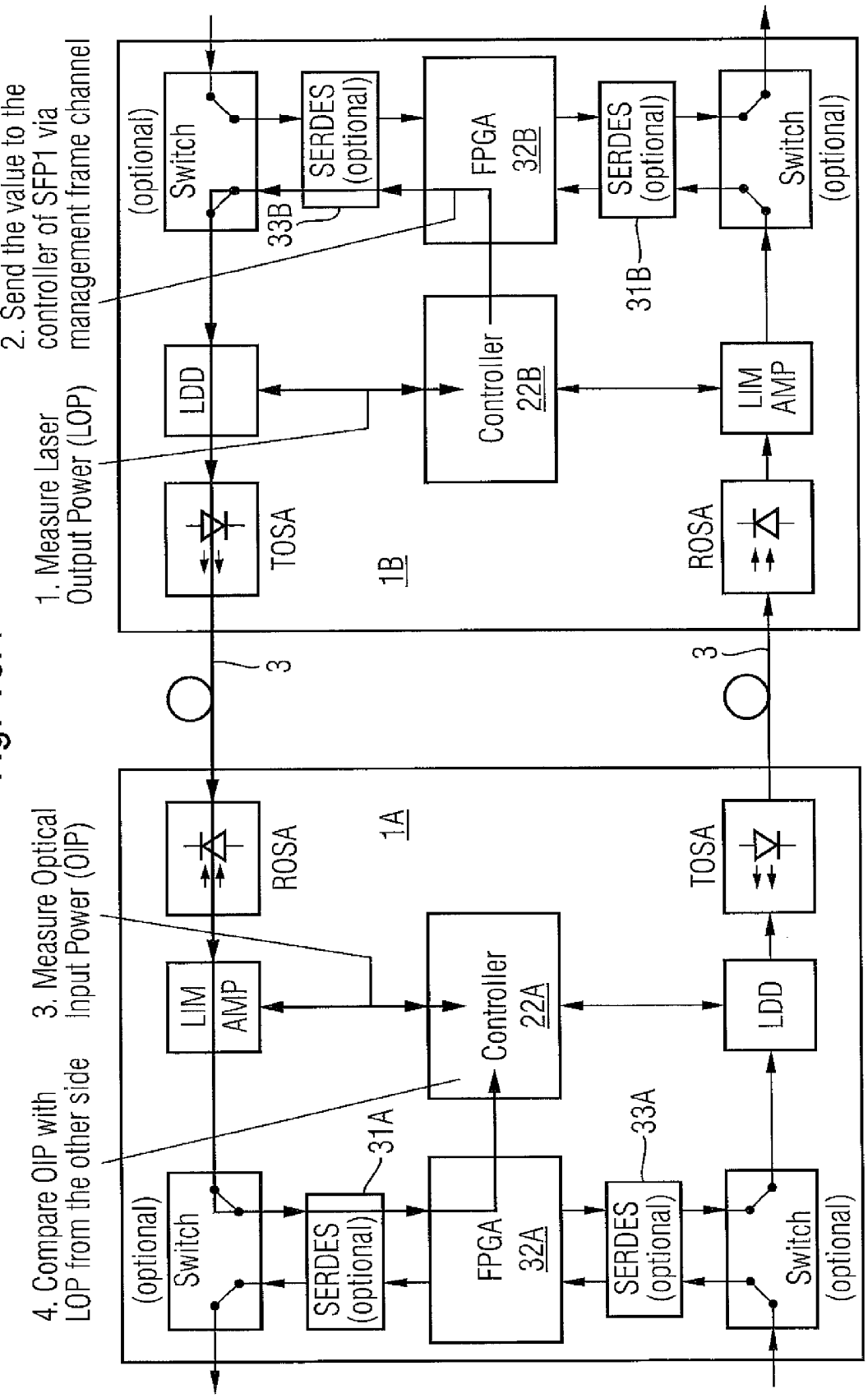

FIG. 18A illustrates a possibility of a line attenuation measurement which can be performed as performance monitoring by the pluggable module 1 according to the present invention. In the shown embodiment the communication is performed via a management channel inside of a frame. First, the controller 22B measures the laser output power in the given example. Then the FPGA 32B of the pluggable module 1B sends the measured value of the controller 22B via a management frame channel to the other pluggable module 1A. In a further step, the controller 22A of the pluggable module 1A measures an optical input power (OIP) and compares then the optical input power with the laser output power (LOP) from the other side.

FIG. 18B shows a further possible embodiment for measuring a line attenuation. First, a laser output power (LOP) is measured. Then, the pluggable module 1B sends the measured value of the laser output power (LOP) to the other pluggable module 1A. The pluggable module 1A compares the received value with its optical input power so that the local FPGA 32A can analyze the attenuation of the link. For monitoring the line attenuation, the start value of attenuation (at the start-up of the line first time) can be compared with the current measurement value of attenuation. Now it is possible to calculate a line attenuation for a time and to monitor if sudden changes occur. In an embodiment, a communication is performed via a pilot tone. In an alternative embodiment, the communication is performed via a management channel inside a frame.

Figure 19:
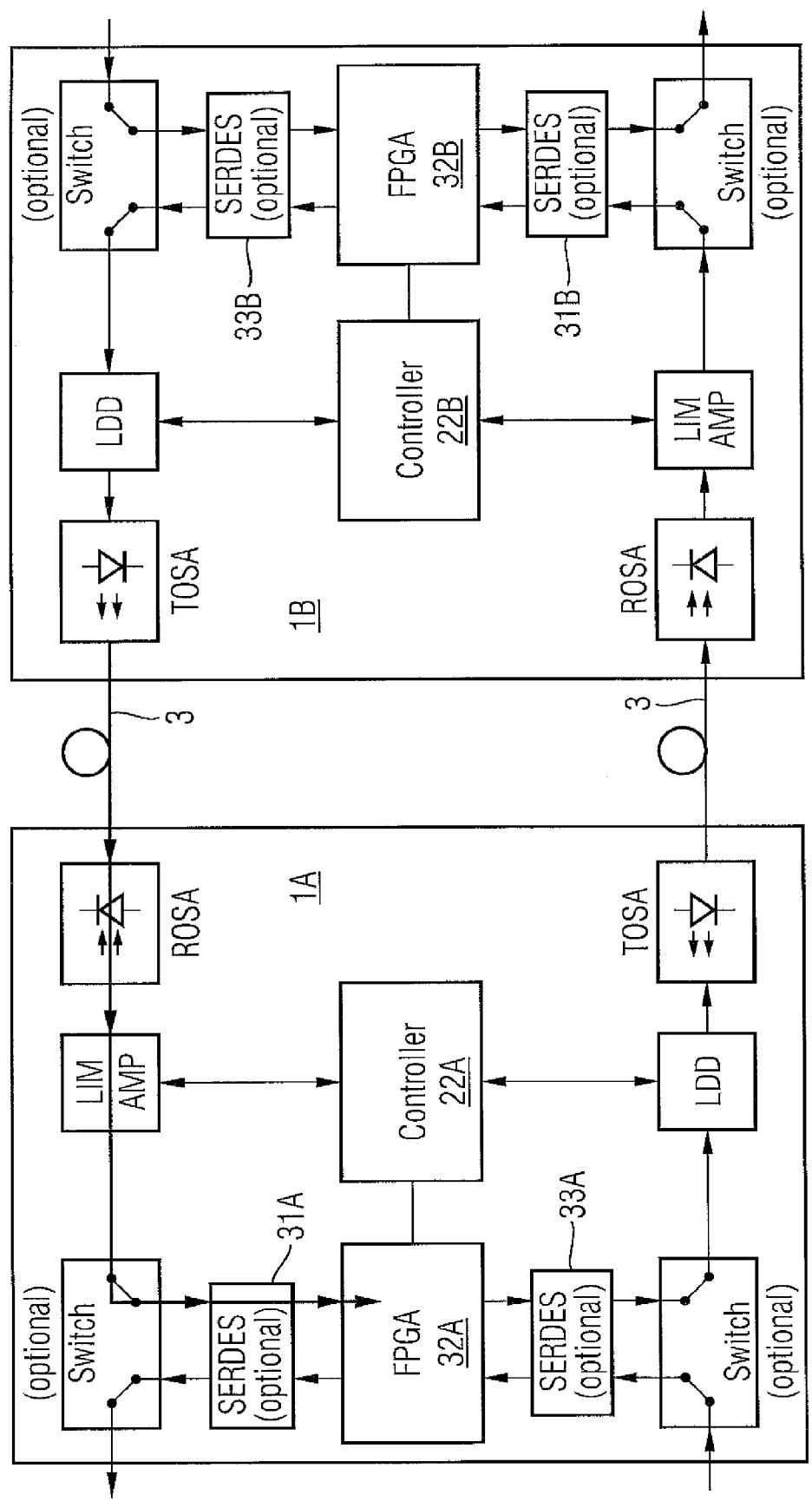
FIGS. 19, 20 illustrate a performance monitoring as performed by the pluggable module according to the present invention.
Figure 20:
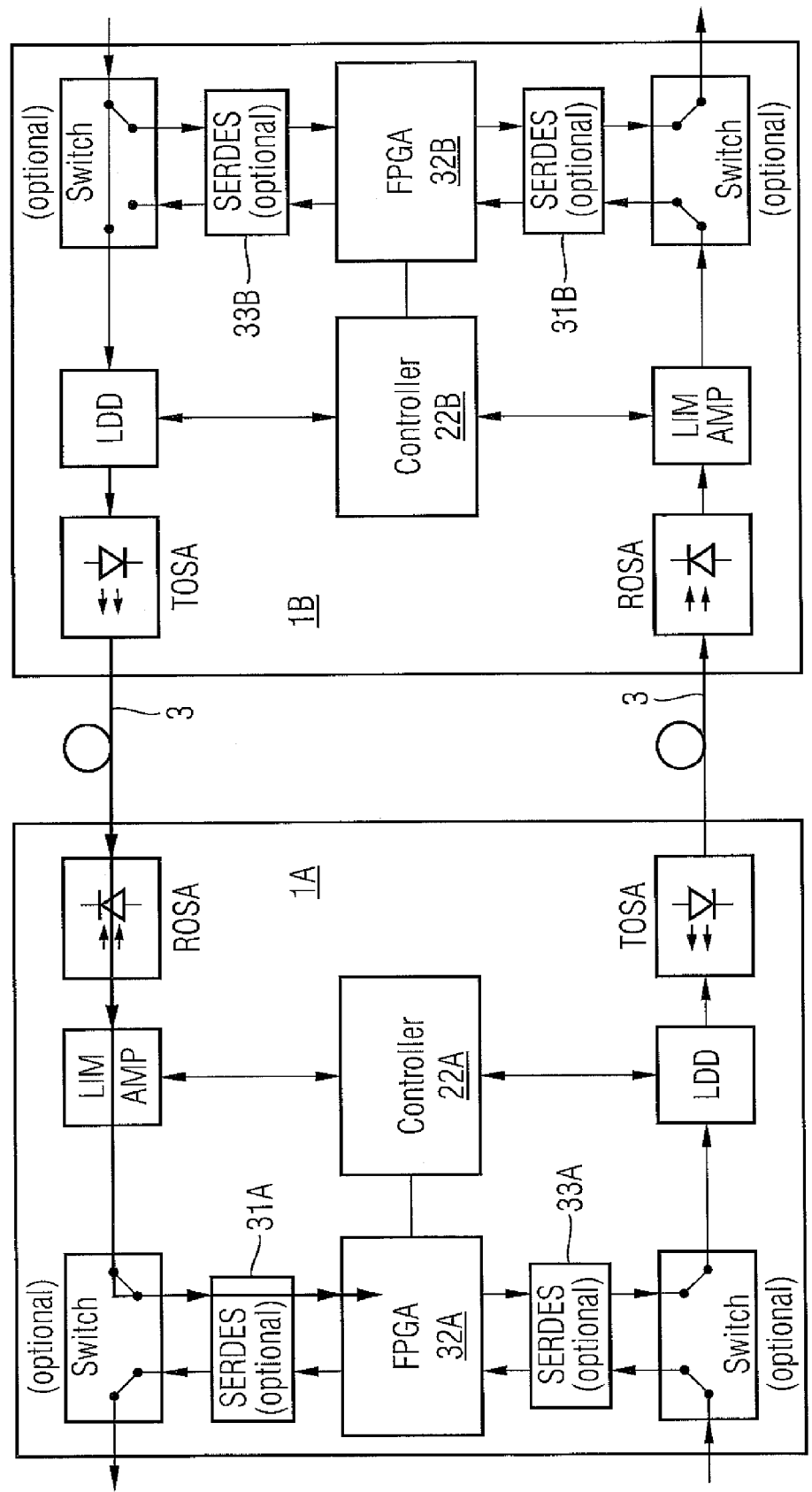

FIGS. 19, 20 illustrate performance monitoring by a pluggable module 1 according to the present invention. The FPGA 32 is provided in the data path for monitoring the data path. The FPGA 32B detects with the help of SERDES various frame properties, such as running disparity, simple disparity, code error or a disparity error.

Figure 21:
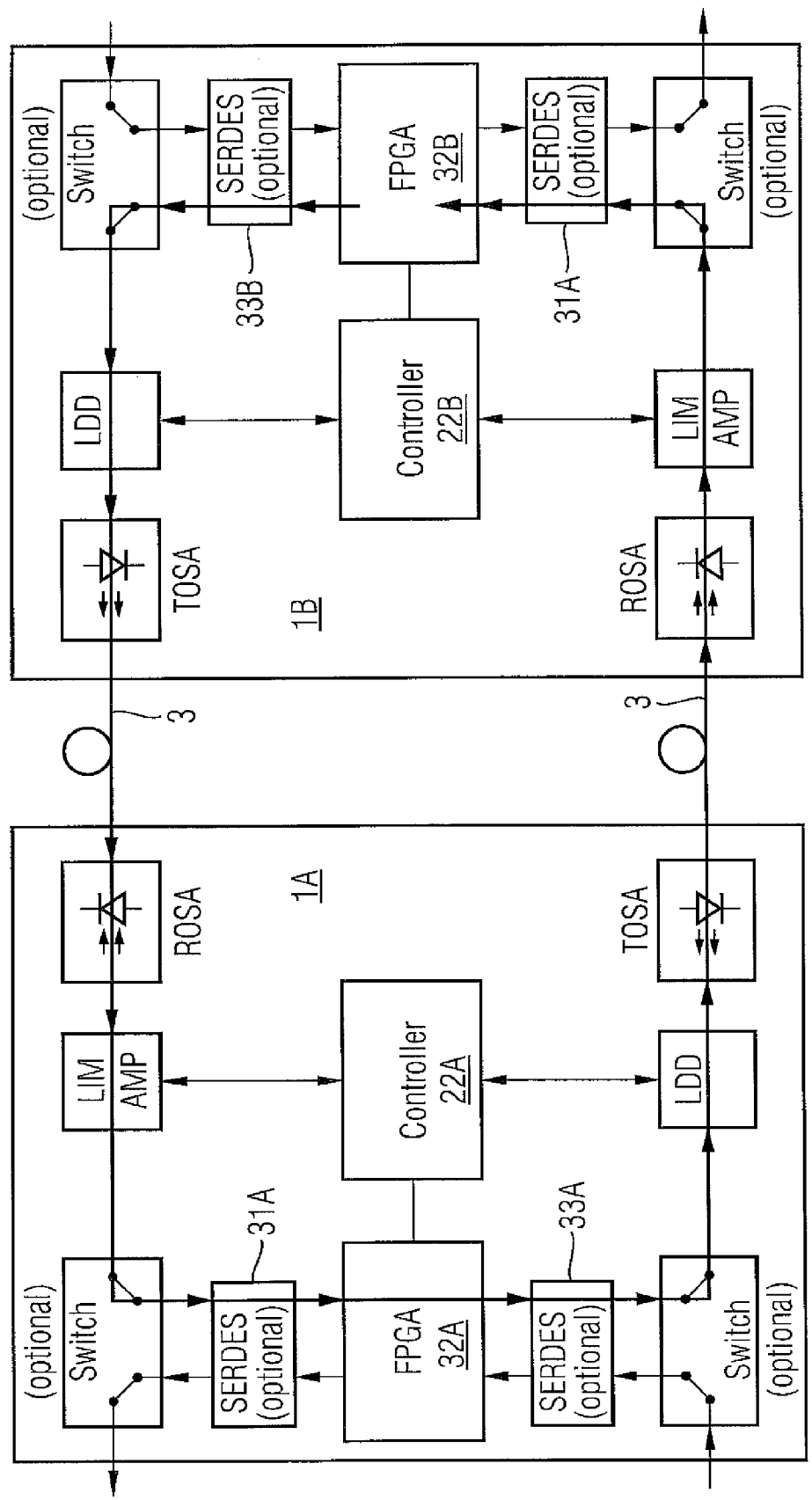
FIG. 21 illustrates a PRBS (Pseudo Random Bit Sequence)-test as performed by a pluggable module according to the present invention.

FIG. 21 illustrates a PRBS (Pseudo Random Bit Sequence) test. In a possible embodiment, the line is analyzed by variation of a PRBS sequence, wherein two various operations can be provided. In a PRBS-loop test as illustrated by FIG. 21, the FPGA 32B of pluggable module 1B sends a PRBS-sequence to the FPGA 32A of the pluggable module 1A. The FPGA 32A of the pluggable module 1A loops the signal. The FPGA 32B of the pluggable module 1B then receives its own PRBS-sequence and can analyze it and can calculate a line quality.

Figure 22:
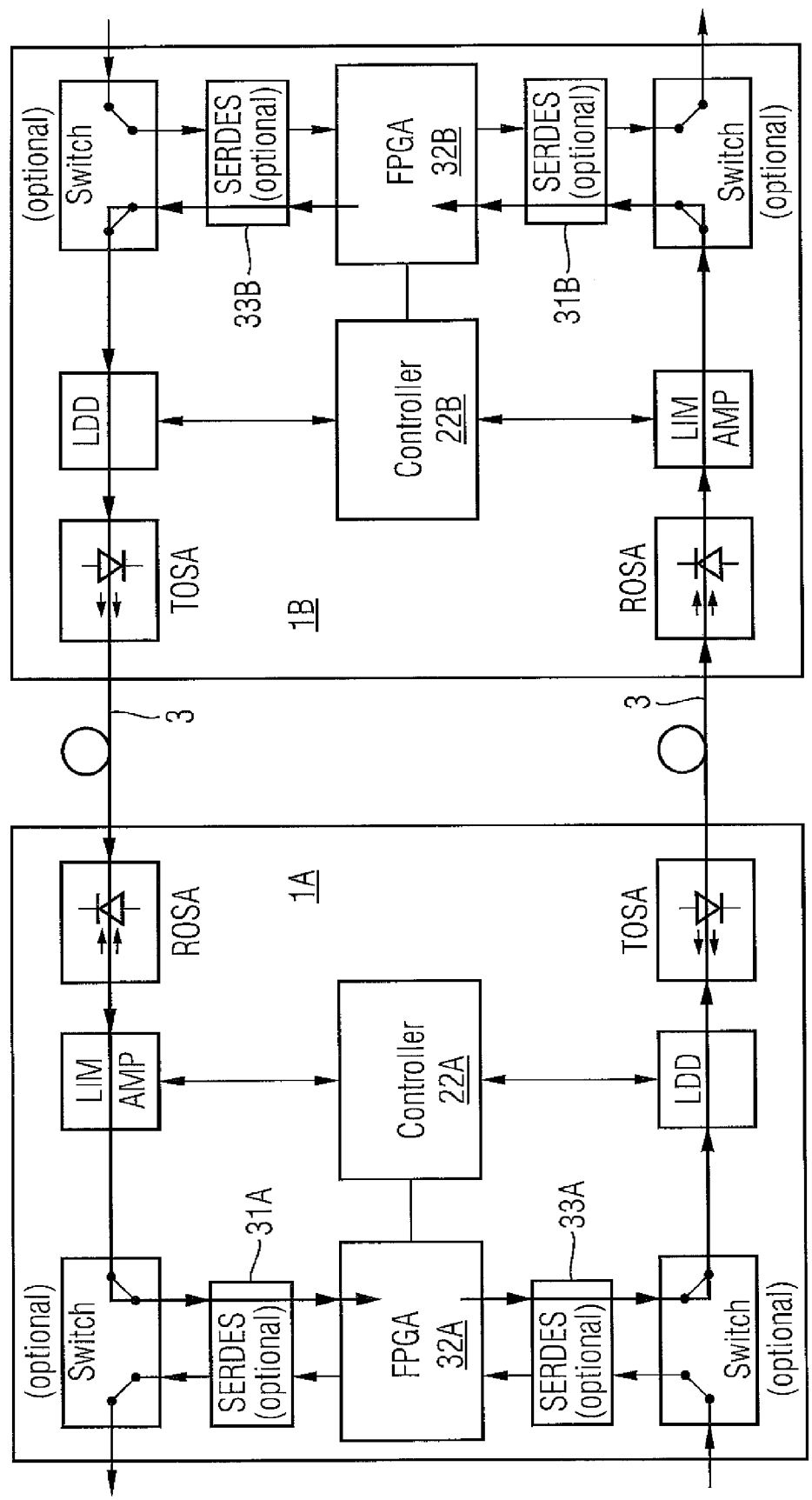
FIG. 22 shows a variant of a PRBS (Pseudo Random Bit Sequence)-test as performed by a pluggable module according to the present invention.
Figure 23:
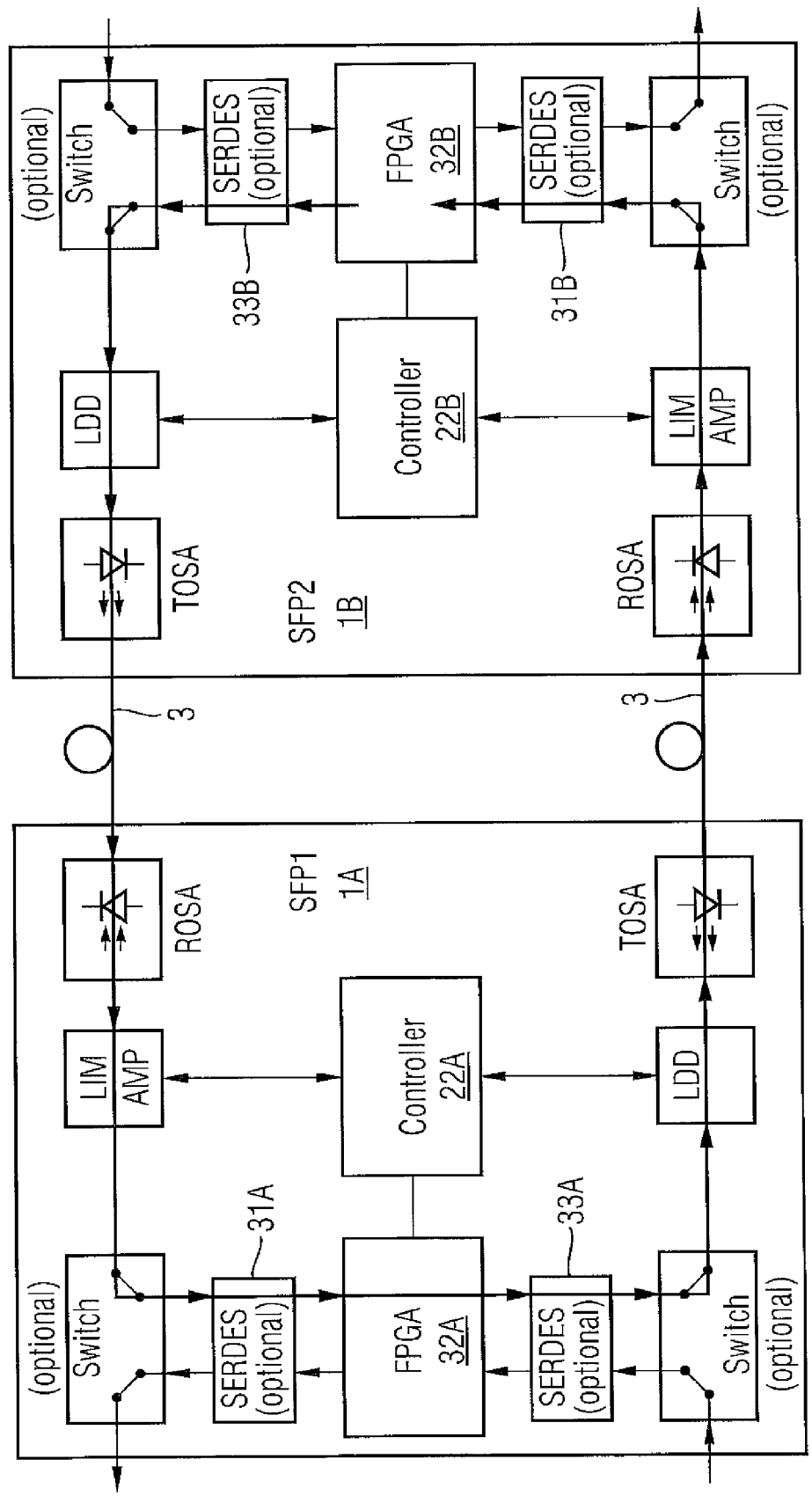
FIG. 23 shows a further embodiment of the pluggable module according to the present invention.

FIG. 22 illustrates a second operation variant for analyzing a line by variation of a PRBS-sequence. In this variant, a separate PRBS-test is performed, i.e. a PRBS-test is performed for each separate line. The FPGA 32A of pluggable module 1A sends a PRBS-sequence to the FPGA 32B of the other pluggable module 1B. Then, the FPGA 32B of pluggable module 1B analyzes the received PRBS-sequence. The same procedure is possible the other way around, i.e. the FPGA 32B of the pluggable module 1B sends the PRBS-sequence to the FPGA 32A of the pluggable module 1A. This is provided for measurements of a line delay (line length). In a line delay loop test FPGA 32B of pluggable module 1B sends a special identifier to the FPGA 32A of the pluggable module 1A. The FPGA 32A of the pluggable module 1A loops the received signal. Then, the FPGA 32B of the second pluggable module 1B receives the special identifier after a line delay time so that it can be analyzed and calculates the line length.

In a possible embodiment, the pluggable module 1 performs a latency measurement of a latency for transporting data from the pluggable module 1 to a far end pluggable module 1'. The measurement can be performed dynamically and without affecting data transmission. In a possible embodiment, the near end pluggable module writes a byte x a time T1 into a signal overhead the far end pluggable module 1 extracts the byte X and writes it to an overhead byte Y at the far end transmitter. The near end pluggable module reads the received byte Y by extracting the T1-time stamp at the time T2. The total delay time is T2−T1. Accordingly, the measured one way latency is T=0.5*(T2−T1).

In a possible embodiment, the latency T is written to the SFF 8472. In an embodiment, the measurement procedure is performed symmetrically, i.e. latency T is available as a dynamical in-service measured parameter at the near end side and at the far end side.

The measurement of the latency T is necessary to fulfil service level agreements (SLA). The latency T sometimes causes protocol buffering to manage protocol throughput, for example in a fibre channel protocol.

In a further embodiment of the pluggable module 1 according to the present invention, the pluggable module 1 performs a link test. A link test is an initialization procedure that takes place before data transmission between host devices 2 is established. A received latency parameter at the far end pluggable module can be evaluated as a link test indication. The purpose of the link test is that it allows to set up and to verify an optical link between two pluggable modules 1 independently from the availability of host data.

Figure 24A:
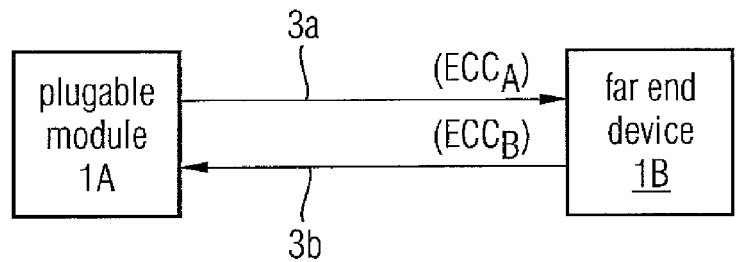
FIGS. 24A, 24B show embodiments of a data transport system comprising an embedded communication channel ECC according to the present invention.

FIG. 24A shows a possible embodiment of the network according to the present invention. In the shown embodiment there is provided a first embedded communication channel ECCA provided for transporting data from a near end pluggable module 1A to a far end device 1B which can also be formed by a pluggable module. Furthermore, a second embedded communication channel ECCB is provided for transporting data from the far end device 1B to the near end pluggable module 1A. In the shown embodiment of FIG. 24A the first embedded communication channel ECCA transports data via a first optical fibre 3A and the second embedded communication channel ECCB transports data via a second optical fibre 3B.

Figure 24B:
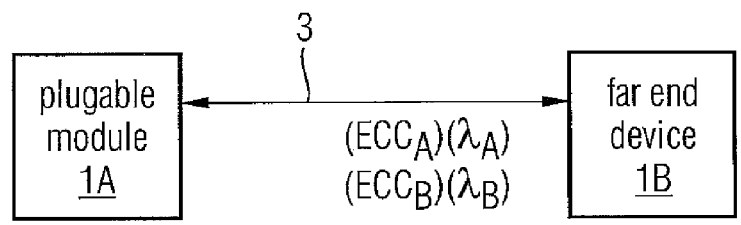

In the alternative embodiment shown in FIG. 24B the first embedded communication channel ECC and the second embedded communication channel EECB transports the data via the same optical fibre 3. The first embedded communication channel ECCA uses a first wave length $\lambda_A$ and the second embedded communication channel ECCB uses a second wave length $\lambda_B$.

In a further embodiment more than two embedded communication channels ECC are provided, i.e. several embedded communication channels for transporting data from the near end pluggable module 1A to the far end device 1B and several embedded communication channels for transporting data from the far end device 1B to the near end pluggable module 1A. The number $n_1$ of embedded communication channels ECC for transporting data from the near end side to the far end side can be equal or different from the number $n_2$ of embedded communication channels provided for transporting data from the far end side to the near end side.

Figure 25:
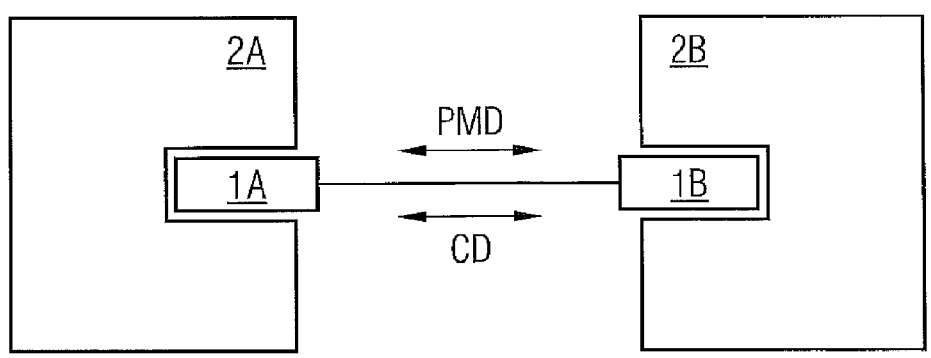
FIG. 25 shows a block diagram illustrating the exchange of performance monitoring data and configuration data by a data transport system according to the present invention.

FIG. 25 illustrates the exchange of performance monitoring data PMD between a near end pluggable module 1A and a far end device 1B which can be formed by another pluggable module plugged into a far end host device 2B. In a possible embodiment the far end device can be formed by the host device 2B.

By providing an embedded communication channel ECC it is possible to generate link parameters of a link between the near end pluggable module 1A and the far end device depending on near end parameters of the near end pluggable module and depending on far end parameters of the far end device. These generated link parameters can comprise physical link parameters PHY-LP and transport protocol link parameters TP-LP.

The generated physical link parameters PHY-LP can comprise a link attenuation of a link between the near end pluggable module 1A and the far end device 1B. In a possible embodiment, the link attenuation of the link is calculated as a difference between the transmit power TX of the near end pluggable module 1A and the reception power RX-Power at the far end device 1B.

For example if the transmit power of the pluggable module 1A is +4 dBm and the reception power of the far end device 1B is −20 dBm the link attenuation can be calculated as follows:

link attenuation=(TX-Power1A−RX-Power 1B)=
+4 dBm−(−20 dBm)=+24 dBm

The link attenuation is an example for a physical link parameter which can be calculated on the basis of data transported via the embedded communication channel ECC.

Furthermore, the provision of an embedded communication channel ECC according to the present invention allows a generation of a transport protocol link parameter TP-LP such as a link quality. The link quality of a link between a near end device and a far end device can be expressed as the difference between a bit error rate detected at a near end pluggable module 1 and the bit error rate detected at the far end device.

The link quality can be calculated as follows:

link quality=$BER_{1A}$−$BER_{1B}$.

The link quality is an example for a transport protocol link parameter TP-LP calculated on the basis of data transported via at least one embedded communication channel ECC.

In general, physical link parameters PHY-LP can be expressed as a function F of near end physical performance monitoring data and far end physical performance monitoring data:

PHY-LP=$F$(near end PHY-PMD,far end PHY-PMD).

Furthermore, transport protocol link parameters TP-LP linked between a near end device and a far end device can be expressed as follows:

TP-LP=$F$(near end TP-PMD,far end TP-PMD).

FIG. 26 is a structure tree of data which can be transported via an embedded communication channel ECC of the transport system according to the present invention. It has to be emphasized that FIG. 26 is only an example and that further physical performance monitoring data, protocol performance monitoring data, physical device configuration data or transport protocol configuration data can be transported via an embedded communication channel ECC in other applications.

Figure 27A:
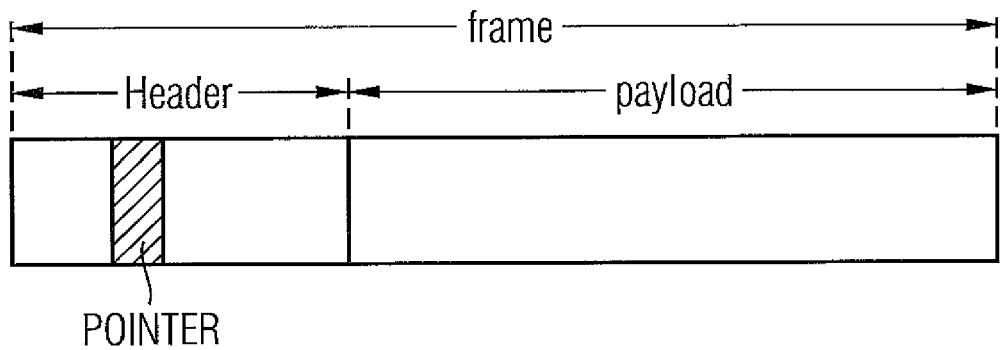
FIGS. 27A, 27B illustrate a possible embodiment for a latency measurement performed within a data transport system according to the present invention.

FIG. 27A shows a frame structure of a data frame or data packet which can be transported via an embedded communication channel ECC for performing a latency measurement. The frame comprises a header or management data and payload data. The header of the frame comprises in the embodiment shown in FIG. 27A a pointer which can be comprised of a predetermined bit sequence. The pointer can comprise a signature.

Figure 27B:
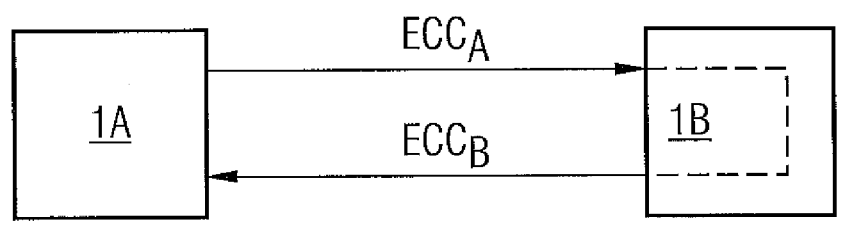

The signature or pointer can have a data length of for example 1 byte. In a possible embodiment the pointer is looped back by the far end device 1B via a signal loop to the near end pluggable module 1A for latency measurement as shown in FIG. 27B. The loop in the far end device 1B can be formed by signal path switches within the far end device which are controlled by a signal path control data signal. The latency is calculated as half the transmission time necessary for the looped back pointer.

In a further embodiment, not only the header or the pointer within the header is looped back but the complete transport protocol frame as shown in FIG. 27A. In this embodiment it is possible by looping back the complete transport protocol frame to perform a link test indicating whether a valid link has been established between the near end device 1A and the far end device 1B.

Accordingly, by providing embedded communication channels ECC it is possible to perform a link test and to measure a latency between a near end device and a far end device under the control of the near end device. With increasing latency the bandwidth for data transport is decreasing.

A link between two devices, i.e. a near end device and a far end device can have a distance of up to several hundred kilometers.

If the configuration is performed independently from the host devices, the protocol of the embedded communication channel ECC allows to detect how many pluggable modules (M) share a common bandwidth (B). For fair bandwidth distribution, each pluggable module 1 effectively determines a fractional bandwidth B:M. The embedded communication channel ECC then automatically configures a set of M-pluggable modules 1 of a common network to a bandwidth B:M each.

The pluggable module 1 according to the present invention performs in a possible embodiment an optical amplification or optical attenuation, optical test functions and an optical dispersion compensation. With this functionality it is possible to connect host devices 2 in an optical network comprising sophisticated optical functions like wavelength division multiplexing (WDM) over longer distances between termination nodes that require a power level and dispersion management. The pluggable module 1 according to the present invention performs in an embodiment a monitoring and a manipulation of optical signals.

The invention provides in an embodiment optical transceiver with a self-terminating communication channel. This embedded communication channel ECC allows the dynamic transmission of important performance parameters between two transceivers or plugs. The transport of performance monitoring parameter PMD and configuration data CD is possible without an adaption of the host devices. The embedded communication channel ECC and the optical domain can use protocol specific bits or can use additional bandwidth such as overhead, management, wave length or pilot tone.

The embedded communication channel ECC is generated independently of the data transmission of the information data. Performance monitoring data PMD which are provided at the local transceiver or plug are written into the embedded communication channel ECC. Furthermore, remote performance monitoring data are read via the embedded communication channel ECC. The remote performance monitoring data are run through a digital diagnostic interface of the pluggable module. The provision of embedded communication channels ECC allows a remote control of a far end device by a near end pluggable module. Furthermore, it is possible to derive link parameters of a link established between a far end device and a near end device.

The invention claimed is:

1. A network comprising:
   at least one host device having an interface card connected to a backplane of said host device,
   wherein said interface card comprises at least one cage for receiving a pluggable module which provides at least one embedded communication channel which exchanges performance monitoring data and configuration data between said pluggable module and a far end device by at least optical fibre,
   wherein via said embedded communication channel said near end pluggable module is provided with near end transport protocol parameters detected at said near end pluggable module, with far end transport protocol parameters detected at said far end device, and with far end physical performance monitoring parameters of said far end device, and
   wherein said configuration data for far end physical device parameters are exchanged via memory cells of a memory within a diagnostic unit of said near end pluggable module.

2. The network according to claim 1, wherein said configuration data comprises physical device configuration data and transport protocol configuration data, said performance monitoring data comprising physical performance monitoring data and transport protocol performance monitoring data, said physical performance monitoring data comprising: transmit power data, reception power data, supply voltage data, temperature data, bias voltage data.

3. The network according to claim 1, wherein via said embedded communication channel said near end pluggable module is further provided with configuration data for near end protocol parameters, with configuration data for far end protocol parameters, and with configuration data for far end physical device parameters.

4. The network according to claim 3, wherein the parameters are exchanged via unallocated memory cells of a memory within a diagnostic unit of said near end pluggable module at a reduced transfer rate which is smaller than the refreshing rate of said memory cells.

5. The network according to claim 3,
   wherein said memory is a SFF-8472 memory comprising: a first page for storing static data, and a second page having a storage area provided for storing dynamic data,
   wherein said performance monitoring data and said configuration data are exchanged via said storage area of said second page provided for storing dynamic data,
   wherein a third page is provided within said memory for exchanging performance monitoring data and configuration data via said embedded communication channel.

6. The network according to claim 1,
   wherein said near end pluggable module generates link parameters of a link between said near end pluggable module and a far end device depending on near end parameters of said near end pluggable module and depending on far end parameters of said far end device,
   wherein said generated link parameters comprise physical link parameters and transport protocol link parameters.

7. The network according to claim 2,
   wherein said physical device configuration data exchanged between said pluggable module and the far end device via said embedded communication channel comprises signal path control data for signal path switching in said near end pluggable module and/or said far end device,
   wherein said signal path control data controls signal path switches provided in a signal path of said near end pluggable module or said far end device such that a signal loop is formed.

8. The network according to claim 7,
   wherein a pointer within a header of a transport protocol frame transmitted by said near end pluggable module is looped back by said far end device via said signal loop to said near end pluggable module for a latency measurement,
   wherein a transport protocol frame comprising a header and a payload is transmitted by said near end pluggable module and looped back by said far end device via said signal loop to said near end pluggable module for a link test.

9. The network according to claim 6,
wherein said generated physical link parameter comprise a link attenuation of a link between said near end pluggable module and said far end device,
wherein said link attenuation is calculated as a difference between the transmit power of said near end pluggable module and the reception power of said far end device.

10. The network according to claim 6,
wherein said generated transport protocol link parameter comprise a link quality,
wherein said link quality is calculated on the basis of a bit error rate detected at said near end pluggable module and a bit error rate detected at said far end device.

11. The network according to claim 1, wherein a first embedded communication channel is provided for transporting data from said near end pluggable module to said far end device, and a second embedded communication channel is provided for transporting data from said far end device to said near end pluggable module.

12. The network according to claim 11, wherein said first embedded communication channel transports data via a first optical fibre, and said second embedded communication channel transports data via a second optical fibre.

13. The network according to claim 11,
wherein said first embedded communication channel and said second embedded communication channel transport data via the same optical fibre,
wherein the first embedded communication channel uses a first wave length, and wherein the second embedded communication channel uses a second wave length.

14. The network according to claim 1, wherein said host devices comprise switching devices and optical transport devices, said switching devices comprising router, bridges, Ethernet switches and fibre channel switches, said optical transport devices comprising SDH-, SONET-, PDH-, OTH-, Ethernet, Fibre Channel, FICON and uncompressed video transport devices.

15. The network according to claim 1, wherein said embedded communication channel is implemented at a physical layer or at a protocol layer.

16. The network according to claim 15, wherein said embedded communication channel is implemented on a proprietary overhead that is generated on top of a transport protocol or said embedded communication channel is implemented based on an overhead of a transport protocol or said embedded communication channel is implemented in the frame structure of a protocol.

17. The network according to claim 1,
wherein said pluggable module comprises a diagnostic unit which receives local performance data from electronic components of said pluggable module, said diagnostic unit comprising a memory for storing performance data and configuration data of said pluggable module,
wherein said pluggable module comprises a mapping unit which controls a laser driver depending on local performance data received from said diagnostic unit to transfer said performance data via said embedded communication channel to said far end device,
wherein said pluggable module comprises a de-mapping unit for storing performance data extracted from the embedded communication channel in a memory of said diagnostic unit.

18. The network according to claim 17,
wherein said memory is a SFF-8472 memory comprising unallocated bytes used for exchanging DMI (digital monitoring interface) performance data with a far end device,
wherein a second set of the SFF-8472 performance data indicating a performance at the far end is stored in said memory.

19. The network according to claim 1,
wherein the pluggable module comprises at least one data processing circuit for performing near end and far end bidirectional performance monitoring,
wherein said data processing circuit is connected to a diagnostic unit of said pluggable module.

20. The network according to claim 19,
wherein said data processing circuit increments at least one performance counter provided in a memory of said diagnostic unit depending on measured performance monitoring data,
wherein said memory of said diagnostic unit is a SFF-8472 memory comprising unallocated bytes used for a ES (error seconds), a SES (severe error seconds) performance counter, a UAS (Unavailable Seconds) performance counter and a BER (Bit Error Rate) performance counter.

21. A pluggable module adapted to be plugged into at least one cage of an interface card of a host device,
wherein said pluggable module performs traffic management of data transported via an optical fibre connected to said pluggable module which provides at least one embedded communication channel which exchanges performance monitoring data and configuration data between said pluggable module and a far end device, and
wherein via said embedded communication channel said near end pluggable module is provided with near end transport protocol parameters detected at said near end pluggable module, with far end transport protocol parameters detected at said far end device, and with far end physical performance monitoring parameters of said far end device, and
wherein said configuration data for far end physical device parameters are exchanged via memory cells of said memory within a diagnostic unit of said near end pluggable module.

22. A host device comprising at least one interface card connected to a backplane of said host device, wherein said interface card comprises at least one cage for receiving a pluggable module according to claim 21.

23. A data transport system for transporting bidirectional optical data via at least one optical fibre, wherein at both ends of said optical fibre a pluggable module according to claim 21 is attached.

24. A method for bidirectional transport of data between host devices of a network via at least one optical fibre,
wherein a pluggable module attachable to said optical fibre is connected to a corresponding cage of one of said host devices and a traffic management is performed during transport of the data by said pluggable module which provides at least one embedded communication channel which exchanges performance monitoring data and configuration data between said pluggable module and a far end device, wherein via said embedded communication channel said near end pluggable module is provided with near end transport protocol parameters detected at said near end pluggable module, with far end transport protocol parameters detected at said far end device, and with far end physical performance monitoring parameters of said far end device, and wherein said configuration data for far end physical device parameters are exchanged via memory cells of said memory within a diagnostic unit of said near end pluggable module.

25. The method according to claim 24, wherein said method is performed by a computer program comprising instructions for performing said method.

26. The network according to claim 24, wherein said memory is a SFF-8472 memory comprising: a first page for storing static data, and a second page having a storage area provided for storing dynamic data, wherein said performance monitoring data and said configuration data are exchanged via said storage area of said second page provided for storing dynamic data, wherein a third page is provided within said memory for exchanging performance monitoring data and configuration data via said embedded communication channel.

* * * * *